US012706396B2

(12) United States Patent
Parsche

(10) Patent No.: US 12,706,396 B2
(45) Date of Patent: Aug. 11, 2026

(54) COMMUNICATIONS DEVICE WITH CONDUCTIVE SINUSOIDAL ELEMENT AND RELATED ANTENNAS AND METHODS

(71) Applicant: EAGLE TECHNOLOGY, LLC, Melbourne, FL (US)

(72) Inventor: Francis E. Parsche, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 18/788,698

(22) Filed: Jul. 30, 2024

(65) Prior Publication Data

US 2026/0039030 A1 Feb. 5, 2026

(51) Int. Cl.
*H01Q 21/24* (2006.01)
*H01Q 11/08* (2006.01)
*H01Q 21/00* (2006.01)

(52) U.S. Cl.
CPC ............ *H01Q 21/24* (2013.01); *H01Q 11/08* (2013.01); *H01Q 21/0087* (2013.01)

(58) Field of Classification Search
CPC ..... H01Q 11/08; H01Q 21/0087; H01Q 21/24
See application file for complete search history.

(56) References Cited

U.S. PATENT DOCUMENTS

| | | | |
|---|---|---|---|
| 2,495,399 | A | 1/1950 | Wheeler |
| 2,929,459 | A | 3/1960 | Spitzmesser |
| 4,658,262 | A | 4/1987 | DuHamel |
| 5,146,234 | A | 9/1992 | Lalezari |
| 5,346,300 | A | 9/1994 | Yamamoto et al. |
| H1460 | H | 7/1995 | Davis |
| 5,892,480 | A | 4/1999 | Killen |
| 6,320,553 | B1 | 11/2001 | Ergene |
| 7,286,099 | B1 | 10/2007 | Lier et al. |
| 7,696,943 | B2 | 4/2010 | Chiang |
| 7,888,663 | B2 | 2/2011 | Zhou et al. |
| 8,259,030 | B2 | 9/2012 | Hanane et al. |
| 8,704,728 | B2 | 4/2014 | Mujahed et al. |
| 8,922,452 | B1 | 12/2014 | O'Brien et al. |

(Continued)

FOREIGN PATENT DOCUMENTS

| | | |
|---|---|---|
| CN | 204809398 | 11/2015 |
| CN | 104638359 A | 10/2018 |

(Continued)

OTHER PUBLICATIONS

Tawk et al. "A Polarization Reconfigurable 3D Printed Dual Integrated Quadrifilar Helix Antenna Array Embedded Within a Cylindrical Dielectric Mesh" IEEE Transactions on Antennas and Propagation: vol. 71, Issue: 1, Jan. 2023 Abstract Only.

(Continued)

*Primary Examiner* — Daniel Munoz
(74) *Attorney, Agent, or Firm* — ALLEN, DYER, DOPPELT, GILCHRIST, P.A. Attorneys at Law

(57) ABSTRACT

A communications device may include an RF device, and a circular cylindrical antenna coupled to the RF device. The circular cylindrical antenna may include a conductive ground plane, a conductive feed associated with the conductive ground plane, and a conductive sinusoidal element coupled to the conductive feed and extending outwardly from the conductive ground plane along a circular cylinder.

25 Claims, 22 Drawing Sheets

(56) References Cited

U.S. PATENT DOCUMENTS

| | | | | |
|---|---|---|---|---|
| 9,634,373 | B2 | 4/2017 | Lee et al. | |
| 9,698,474 | B2 | 7/2017 | Aubert et al. | |
| 10,727,607 | B2 | 7/2020 | Luo et al. | |
| 11,165,167 | B2 | 11/2021 | Rentz | |
| 2006/0232493 | A1 | 10/2006 | Huang et al. | |
| 2009/0079658 | A1 | 3/2009 | Surducan et al. | |
| 2010/0194665 | A1* | 8/2010 | Hanane | H01Q 11/08 343/895 |
| 2018/0076528 | A1* | 3/2018 | Tawk | H01Q 15/16 |
| 2020/0365991 | A1* | 11/2020 | Hong | H01Q 7/08 |
| 2023/0253700 | A1* | 8/2023 | Parsche | H01Q 1/48 343/895 |
| 2025/0119915 | A1 | 4/2025 | Ma et al. | |

FOREIGN PATENT DOCUMENTS

| | | | |
|---|---|---|---|
| CN | 105786185 | B | 1/2019 |
| CN | 109378588 | | 2/2019 |
| CN | 112134004 | B | 7/2022 |
| CN | 115598585 | A | 1/2023 |
| CN | 116014460 | | 4/2023 |
| KR | 20070079761 | A | 8/2007 |
| KR | 100881281 | B1 | 9/2008 |
| RU | 2819847 | | 5/2024 |
| WO | WO 2009/034125 | | 11/2008 |

OTHER PUBLICATIONS

John D. Kraus “Helical Beam Antennas For Wide-Band Applications” Proceedings of the Institute Of Radio Engineers, 36, pp. 1236-1242, Oct. 1948.

H. Yagi “Beam Transmission of Short Waves” Proceedings of the Institute of Radio Engineers, 1928, vol. 16, Issue 6, pp. 715-740.

Peter P. Viezbicke “Yagi Antenna Design” NBS Tech Note 688, National Bureau of Standards (NBS), Dec. 1976; pp. 23.

Wang et al. “Satellite-based sinusoidal Archimedes spiral antenna with circular polarization plane” Proceedings vol. 12594, Second International Conference on Electronic Information Engineering and Computer Communication 2023; Mar. 29, 2023; p. 7.

Shoaib et al. “Dual Mode Helix Antenna for wideband terrestrial and Gps L2 communications” Proceedings of the 5th European Conference on Antennas and Propagation (EUCAP) Apr. 1-15, 2011; pp. 4.

W.A. Cumming “A Nonresonant Endfire Array for VHF and UHF” Ire Transactions- Antennas and Proagation: Apr. 1955; pp. 52-58.

Dipak L. Sengutpa “The Radiation Characteristics of a Zig-Zag Antenna” IRE Transaction on Antennas an Propagation: 1958 ; 191-194.

Xu et al. “A Novel Dual Linearly-Polarized Antenna Based on Counter-Wound Quadrifilar Helix Structures” 2023 International Conference on Microwave and Millimeter Wave Technology (ICMMT); 2023 pp. 3.

Yuan et al. “A Dual Circularly Polarized Co-Aperture Yagi Antenna Based on Counter-Wound Helix” 2022 IEEE MTT-S Intemational Microwave Workshop Series on Advanced Materials and Processes for RF and THz Applications (IMWS-AMP) pp. 3.

Zhang et al. “Design of Miniaturized Dual-Mode Antenna for Handset Terminal Communication” International Journal of RF and Microwave Computer-Aided Engineering vol. 2023, Article ID 4283737, pp. 11.

Zhao et al. “A Compact Dual-Band Assembled Quadrifilar Helix Antenna for LEO Satellite Communcations” 2023 International Conference on Microwave and Millimeter Wave Technology (ICMMT) 2023 IEEE; pp. 3.

Lu et al. “Dual-Helix Monopole Antenna with Circular Polarization Operation for Minimally Invasive Surgery System” Progress In Electromagnetics Research Letters, vol. 51, Jul. 14, 2015; pp. 8.

Xue et al. “Spaceborne miniaturized UHF dual band helix antenna with a small frequency ratio” Microwave and Optical Technology Letters: vol. 63, Issue6; Jun. 2021; Abstract Only.

Ahadi et al. Wearable Sensor Based on Flexible Sinusoidal Antenna for Strain Sensing Applications: Sensors (Basel) May 27, 2022;22(11): 4069 Abstract Only.

Wang et al. “High Modulation Freedom Leaky-wave Antenna Based on Sinusoidal Phase Grating Modulation” ICEAA-IEEE APWC 2023; Venice, Italy, Oct. 9-13, 2023; Abstract Only.

Ushaben Keshwala “Microstrip line fed sinusoidal tapered square shaped MIMO antenna for THz applications” Optik—International Journal for Light and Electron Optics: 247 (2021) 167905; pp. 8.

Qui et al. “A miniatured helical antenna based on the sinusoidal folding structure with exponential spacing” Rev Sci Instrum Aug. 1, 2022;93(8):084702. Abstract Only.

Cai et al. “Design of Conical Broadband Four-arm Sinusoidal Navigation Antenna” 2022 14th International Conference on Measuring Technology and Mechatronics Automation (ICMTMA); pp. 4.

Keshwala et al. “Ultra-wideband mushroom shaped half-sinusoidal antenna for THz applications” Optik: vol. 228, Feb. 2021, 166156 Abstract Only.

Yang et al. “Dual-Band Slot Helix Antenna for Global Positioning Satellite Applications” IEEE Transactions on Antennas and Propagation, vol. 64, No. 12, Dec. 2016 pp. 7.

Liu et al. “Analysis of a Packable and Tunable Origami Multi-Radii Helical Antenna” Digital Object Identifier 10.1109/ACCESS.2019.2892711; Jan. 14, 2019; pp. 12.

Kumer et al. “Optimal Radiation Pattern of the Element for a Spherical Phased Array With Hemispherical Scan Capability” IEEE Antennas and Wireless Propagation Letters, vol. 16, 2017; pp. 3.

Li et al. “Multiband Multimode Arched Bow-Shaped Fractal Helix Antenna” Progress In Electromagnetics Research, vol. 141, 47{78, 2013; pp. 32.

Fakhte et al. “A helical shaped broadband circularly polarized dielectric resonator antenna” Journal of Electromagnetic Waves and Applications, 34(14), Abstract Only.

Jin et al. “Metasurface integrated with double-helix point spread function and metalens for threedimensional imaging” Nanophotonics 2019; 8(3): 451-458.

Lundberg et al. “Novel Timing Antennas for Improved GNSS Resilience” Homeland Security Systems Engineering and Development Institute: https://apps.dtic.mil/sti/citations/AD1107974 Feb. 1, 2018 pp. 14.

Guan et al. “Electromagnetic Polarization Technique in HF Mobile Communication” 2010 International Conference on Communications and Mobile Computing: pp. 4.

S. Chakrabarti, “An S-/Ka-Band Shared Aperture Tracking Reflector Antenna With Polarization Diversity,” IEEE Transactions on Antennas and Propagation, vol. 69, No. 6, pp. 3165-3176, Jun. 2021. Abstract Only.

“Triband (S, X, Ka) Antenna dual circularly polarized Monopulse feed for LEO satellite Auto tracking and Data reception” from NewSpace India Limited (NSIL). https://www.nsilindia.co.in Retrieved from internet 2/182026; p. 9.

ANTESKY “7.3m-S/Ka-Band-full-motion Antenna” https://antesky.com/project/7-3m-ska-band-full-motion Antenna; Retrieved from internet Feb. 2, 2026 p. 3.

Xu et al. “Ka/S dual-band antenna for satellite communication” https://onlinelibrary.wiley.com/doi/10.1002/ mop.26791; Abstract Only.

Zanon et al. “Current Lunar dust mitigation techniques and future directions” https://www.sciencedirect.com/ science/article/pii/S0094576523004939#fig5 p. 18.

Zhang et al. “Dual-Band Dual-Polarization Horn Antenna Array Based on Orthomode Transducers With High Isolation for Satellite Communication” IEEE Transactions On Antennas and Propagation, vol. 70, No. 10, Oct. 2022 9247-.

Xihong Ye “A Short Length Smooth-Walled Spline-Profile Horn for Ka-band Satellite Communication Applications” 2023 Cross Strait Radio Science and Wireless Technology Conference (CSRSWTC) 2023 IEEE; p. 2.

Ye et al. “A Smooth-Walled Spline-Profile Horn for Ka-band Satellite Communication Applications” 2023 IEEE 11th Asia-Pacific Conference on Antennas and Propagation (APCAP) p. 2.

(56) References Cited

OTHER PUBLICATIONS

Sadhukhan et al. "Dual Circularly Polarized Shared Aperture Reflector Antenna for S/Ka-Band Telemetry Tracking" 2023 3rd International Conference on Range Technology (Icort); IEEE 2023: p. 6.
Corkum, "Isotropic Artificial Dielectric", Proceeding of the I. R.E., May 1952; pp. 574-587.

* cited by examiner

150

| NAME | Theta | Ang | Mag |
|---|---|---|---|
| m1 | 360.0000 | -0.0000 | -23.1948 |
| m2 | 336.0000 | -24.0000 | 8.2203 |
| m3 | 24.0000 | 24.0000 | 8.2573 |

COMMUNICATIONS DEVICE WITH CONDUCTIVE SINUSOIDAL ELEMENT AND RELATED ANTENNAS AND METHODS

TECHNICAL FIELD

The present disclosure relates to the field of communications, and, more particularly, to a wireless communications device and related methods.

BACKGROUND

Although the field of antennas is approximately 130 years old, antenna types and their designs may remain artisan in nature. Radiation pattern requirements, in and of themselves, may not suggest all possible antenna shapes that are useful. For example, Fourier Transform techniques may refer to a radiation pattern shape and a planar antenna aperture current distribution. Nonetheless, the Fourier Transform may not easily define an elongate end fire antenna.

During a golden age for antenna design, many of the Euclidian geometries were implemented in metal and used as antennas with useful results. For example, these approaches may comprise: the line-based wire dipole, the circular loop, the conical horn, and the parabolic reflector antenna, etc. The Euclidian shapes may offer optimizations of the shortest distance between two points for the line dipole. Also, these shapes may offer maximum radiation resistance for length, most area enclosed for least circumference for circular loops and circular patches, and maximum directivity for aperture area.

Elongate antennas may be desirable for Earth satellites as planar broadside firing antennas may not fit within a limited satellite size and area. An elongate antenna of high directivity and gain is provided by a cascade of multiple dipoles known as the Yagi-Uda Antenna. ("Beam Transmission Of Short Waves", Proceedings of the Institute Of Radio Engineers, 1928, Volume 16, Issue 6, pages 715-740). This reference referred to the many directors as a "wave canal". These director systems may be known today as artificial lenses. A Yagi-Uda antenna may be narrow in bandwidth, which limits its application, and the beam may be asymmetric.

In an existing approach, an antenna providing circular polarization is an axial mode wire helix antenna. An example is disclosed in "Helical Beam Antennas For Wide-Band Applications", John D. Kraus, Proceedings Of The Institute Of Radio Engineers, 36, pp 1236-1242, October 1948. An improvement to the wire axial mode helix is found in U.S. Pat. No. 5,892,480 to Killen, assigned to the present application's assignee. This approach for a directional antenna comprises a helix-shaped antenna. Although this antenna is directional, the helix-shaped antenna may not provide dual polarizations and modifications for linear polarization may be less than desirable.

Referring briefly to FIGS. 1A-1B, another existing approach discloses a helix-shaped antenna 100. This antenna 100 includes a helix-shaped conductor 101, and a conductive plane 102 coupled to the helix-shaped conductor. Diagram 150 shows gain performance for the antenna 100. The provided gain has a non-flat profile, which is less desirable in radio design.

SUMMARY

Generally, a communications device may comprise a radio frequency (RF) device, and a circular cylindrical antenna coupled to the RF device. The circular cylindrical antenna may comprise a conductive ground plane, at least one conductive feed associated with the conductive ground plane, and at least one conductive sinusoidal element coupled to the at least one conductive feed and extending outwardly from the conductive ground plane along a circular cylinder.

In some embodiments, the at least one conductive sinusoidal element may comprise a plurality of conductive sinusoidal elements, and the at least one conductive feed may comprise a plurality of conductive feeds with a respective conductive feed coupled to each conductive sinusoidal element. The plurality of conductive sinusoidal elements may comprise four conductive sinusoidal elements equally-sized and arranged about the circular cylinder. The RF device may be configured to operate with the circular cylindrical antenna in at least one of a right-handed circular polarization (RHCP), a left-handed circular polarization (LHCP), a first linear polarization, and a second linear polarization different from the first linear polarization. Also, adjacent ones of the plurality of conductive sinusoidal elements may be nested together.

More specifically, the circular cylindrical antenna may comprise a circular cylindrical dielectric substrate, and the at least one conductive sinusoidal element may comprise at least one conductive trace on the circular cylinder dielectric substrate. The conductive ground plane may have a width greater than a diameter of the circular cylinder.

Also, the at least one conductive feed may comprise at least one coaxial cable feed coupling the RF device and the circular cylindrical antenna. The at least one coaxial cable feed may comprise an inner conductor and an outer conductor surrounding the inner conductor, and the outer conductor may be coupled to the conductive ground plane. The inner conductor may extend through the conductive ground plane and is coupled to a proximal end of the at least one conductive sinusoidal element. The proximal end of the at least one conductive sinusoidal element may define a gap with adjacent portions of the conductive ground plane.

For example, the circular cylindrical antenna may have an operating wavelength. The circular cylinder may have a diameter between 0.3 and 0.5 of the operating wavelength. The circular cylinder may have a height between 0.5 and 1 of the operating wavelength, and the at least one conductive sinusoidal element may define a wave period between 0.05 and 0.3 of the operating wavelength. The at least one conductive sinusoidal element may have a shape based upon $(d/4)\sin(2\pi f)+0.8(d/4)\sin(2\pi f)$. Where f is an operating frequency of the circular cylindrical antenna, and where d is a diameter of the circular cylinder.

Another aspect is directed to a circular cylindrical antenna to be coupled to an RF device. The circular cylindrical antenna may comprise a conductive ground plane, at least one conductive feed associated with the conductive ground plane, and at least one conductive sinusoidal element coupled to the at least one conductive feed and extending outwardly from the conductive ground plane along a circular cylinder.

Another aspect is directed to a method for making a circular cylindrical antenna to be coupled to an RF device. The method may include forming a conductive ground plane, and positioning at least one conductive feed associated with the conductive ground plane. The method also may include forming at least one conductive sinusoidal element to be coupled to the at least one conductive feed and extending outwardly from the conductive ground plane along a circular cylinder.

DETAILED DESCRIPTION

Figure 1A:
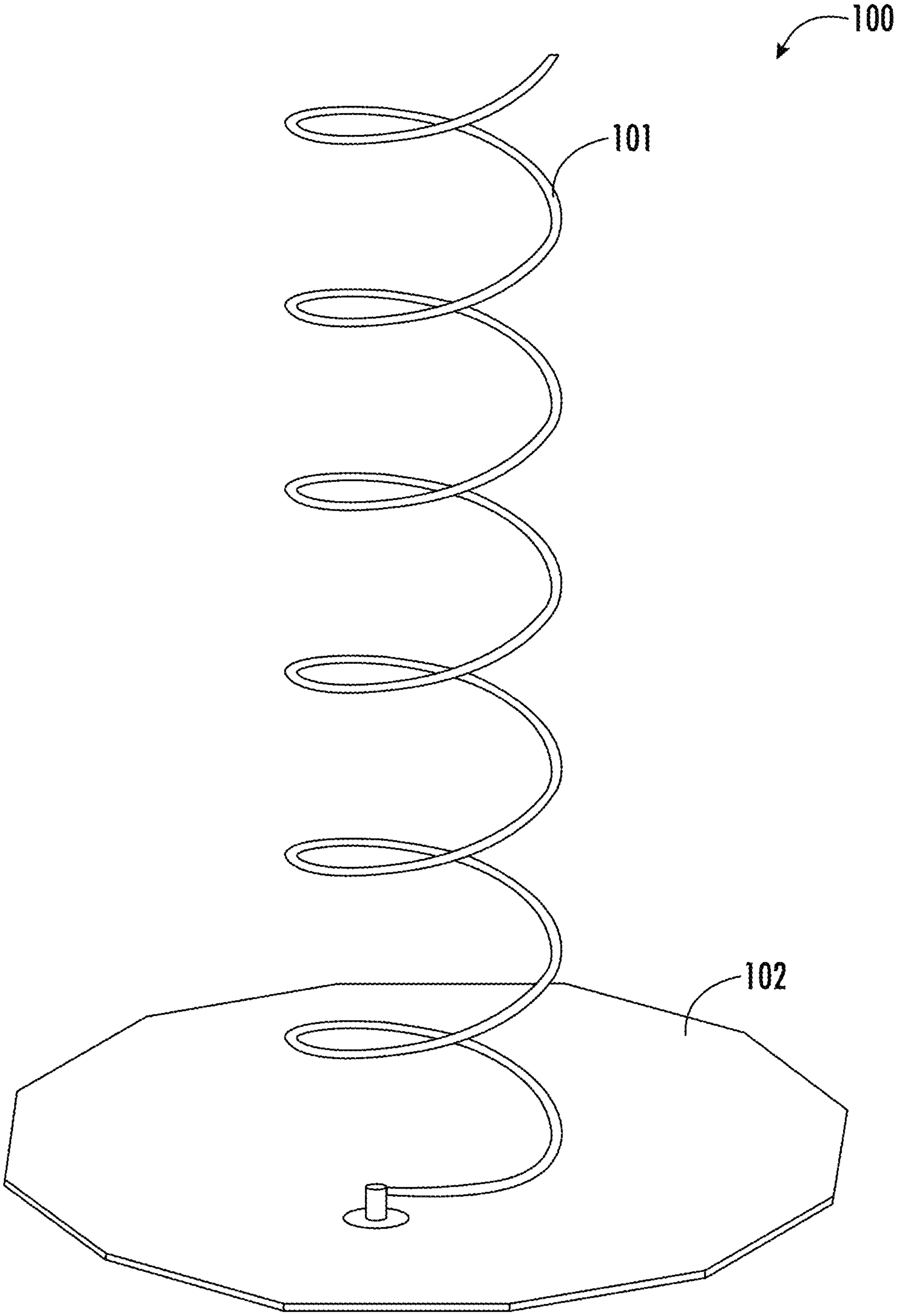
FIG. 1A (PRIOR ART)
FIG. 1A is a perspective view of an antenna, according to the prior art.
Figure 1B:
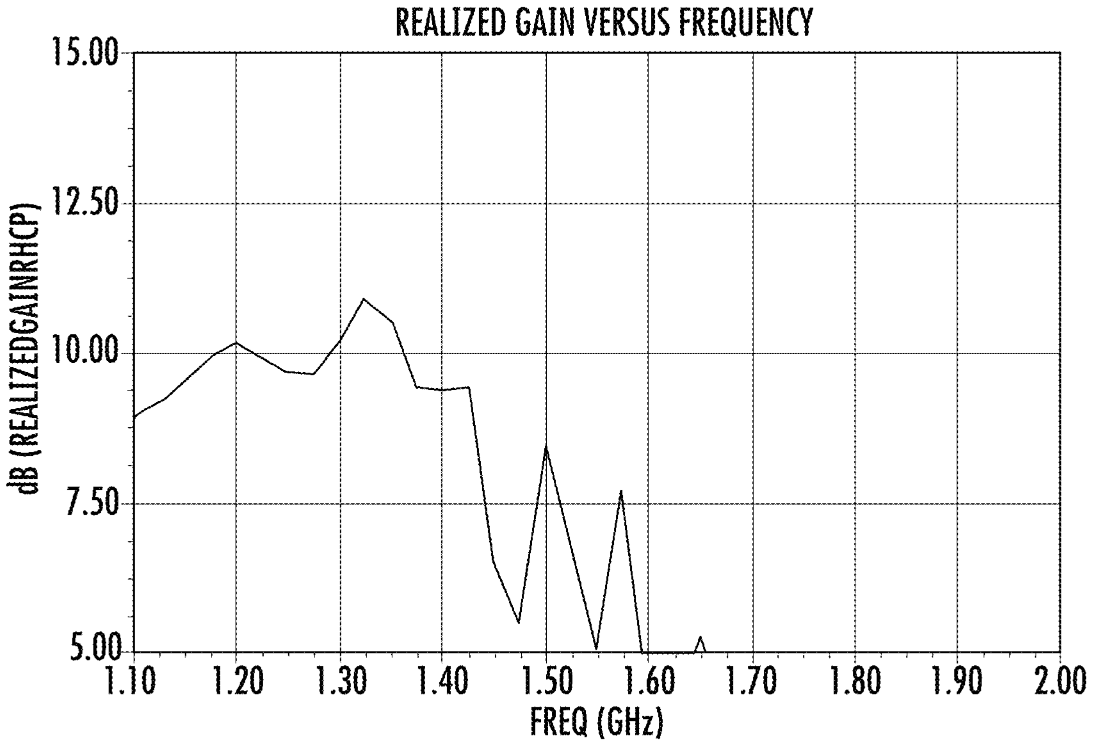
FIG. 1B (PRIOR ART)
FIG. 1B is a diagram of gain in the antenna of FIG. 1A.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

For the prior art antenna 100, this approach is an axial mode helix antenna. Because of this, helix antennas may be polarization limited. In particular, the antenna 100 may provide limited circular polarization only. For multiple polarization applications, these may need multiple helix antennas, one for each polarization, increasing size and weight. Also, linear polarization may not be possible. A new approach to end fire antenna radiation and multiple polarizations may be needed.

Figure 2A:
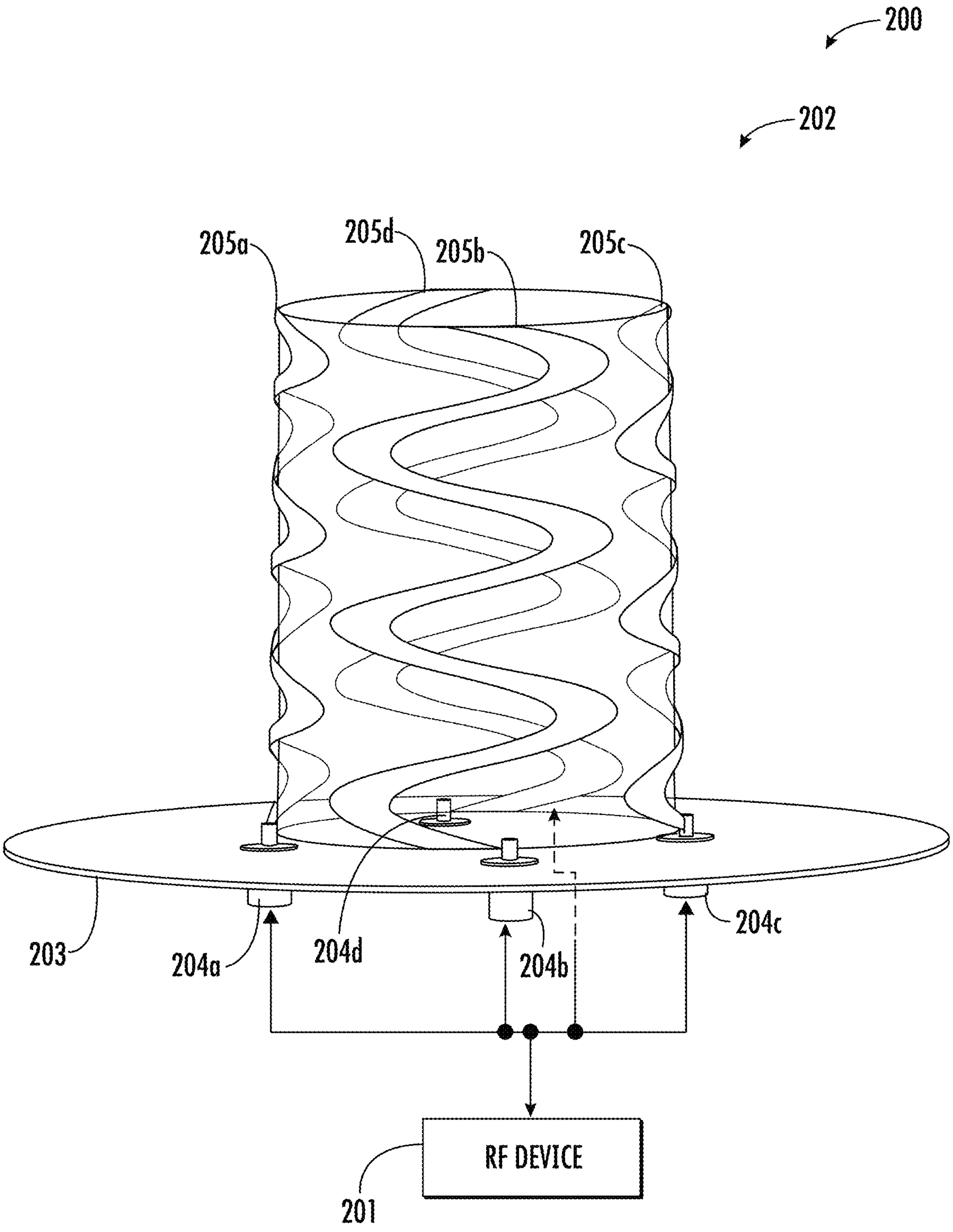
FIG. 2A is a perspective view of a communications device, according to a first example embodiment of the present disclosure.
Figure 2B:
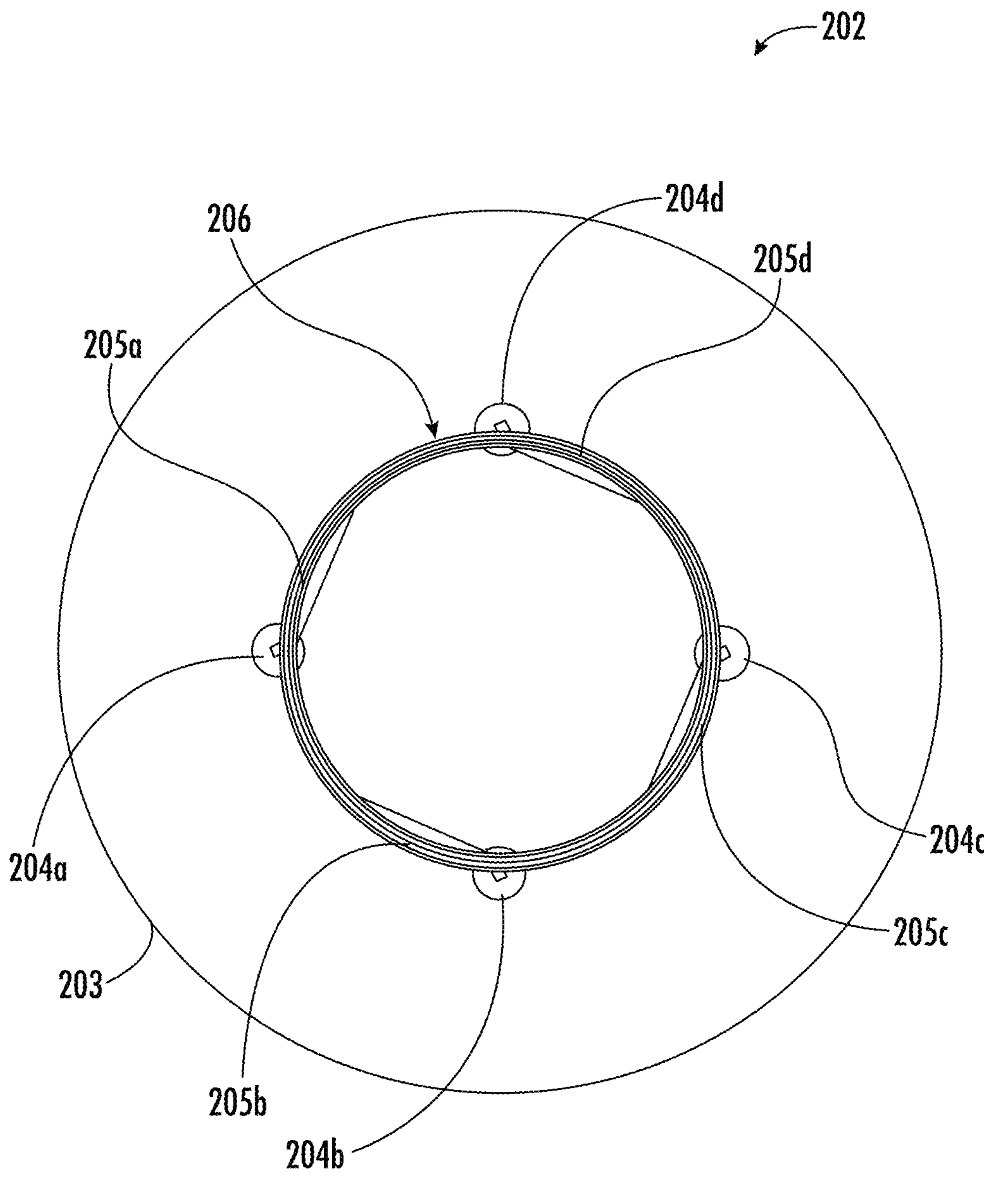
FIG. 2B is a top down plan view of a circular cylindrical antenna from the communications device of FIG. 2A.
Figure 2C:
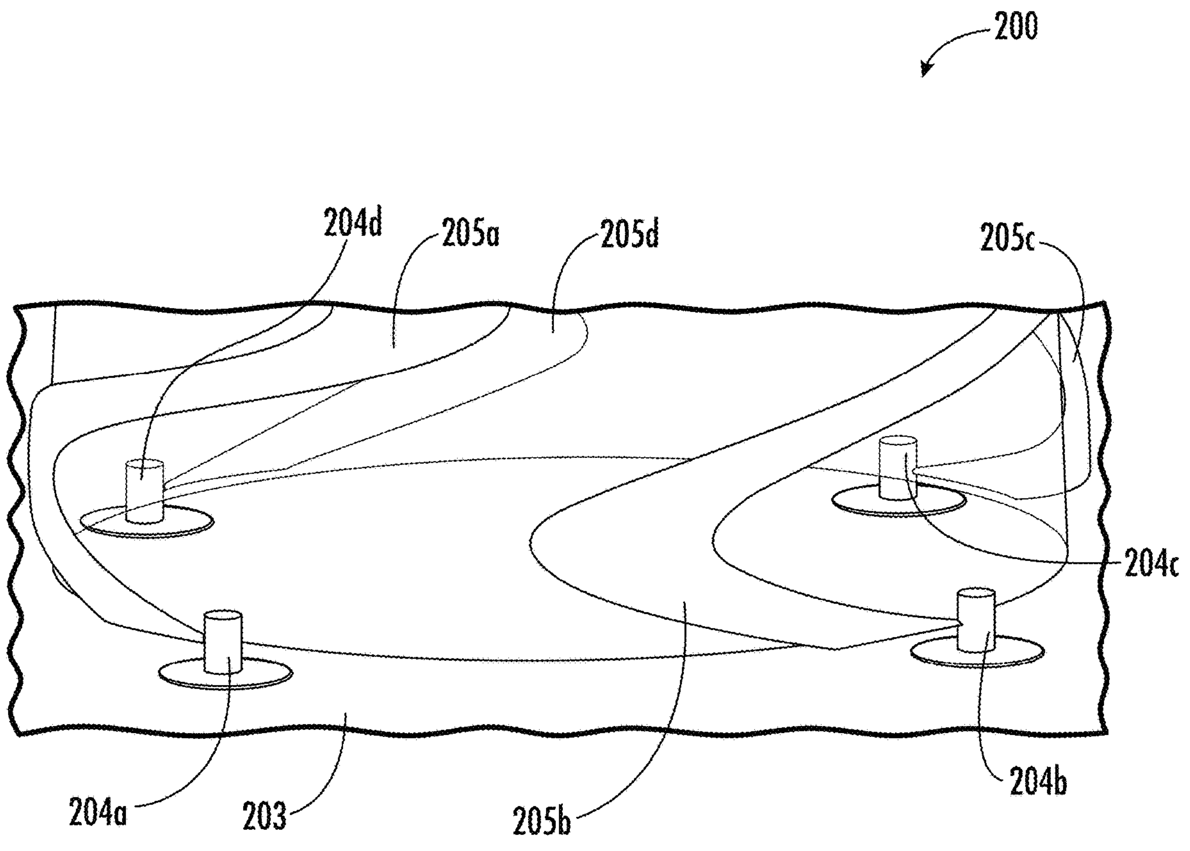
FIG. 2C is an enlarged perspective view of the circular cylindrical antenna from the communications device of FIG. 2A.

Referring now to FIGS. 2A-2C, a communications device 200 according to the present disclosure is now described. The communications device 200 also provides an approach to overcome the potential drawbacks of existing approaches.

The communications device 200 includes an RF device 201, and a circular cylindrical antenna 202 coupled to the RF device. The circular cylindrical antenna 202 illustratively includes a conductive ground plane 203, and a plurality of conductive feeds 204*a*-204*d* associated with the conductive ground plane. In particular, the plurality of conductive feeds 204*a*-204*d* may extend through respective passageways in the conductive ground plane 203.

The circular cylindrical antenna 202 illustratively comprises a plurality of conductive sinusoidal elements 205*a*-205*d* coupled respectively to the plurality of conductive feeds 204*a*-204*d* and extending outwardly from the conductive ground plane 203. For example, each of the conductive ground plane 203, the plurality of conductive feeds 204*a*-204*d*, and the plurality of conductive sinusoidal elements 205*a*-205*d* may comprise one or more of copper, aluminum, silver, and gold. It is understood that conductive sinusoidal elements 205*a*-205*d* could also constitute cosine conductive elements 205*a*-205*d*, or sinusoidal elements shifted in phase structurally to start at any point in the structures cyclic motion.

In particular, the plurality of conductive sinusoidal elements 205*a*-205*d* extend upward and away from the conductive ground plane 203 at a transverse angle (e.g., the substantially perpendicular angle in the illustration, ±10° of 90°). As perhaps best seen in FIGS. 2A-2B, the plurality of conductive sinusoidal elements 205*a*-205*d* extends along a circular cylinder 206. As will be appreciated, the sides of the circular cylinder 206 are substantially perpendicular to the conductive ground plane 203, and define a constant diameter for the circular cylinder as it progresses distally and away from the conductive ground plane 203.

The conductive ground plane 203 illustratively has a width greater than a diameter of the circular cylinder 206. Also, the conductive ground plane 203 is illustratively circle-shaped, but may take other shapes, such as an oval, or polygonal shape. Further, in some embodiments, the conductive ground plane 203 may be integrated into the body of a mobile platform.

As shown in the illustrated embodiment, the plurality of conductive sinusoidal elements 205*a*-205*d* comprises four conductive sinusoidal elements equally-sized and arranged about the circular cylinder 206 (i.e., radially spaced apart at 90° to provide an orthogonal arrangement). Also, adjacent ones of the plurality of conductive sinusoidal elements 205*a*-205*d* may be nested together closely for compact size or they may be spaced further apart around the circular cylinder 206 circumference. Spaced apart conductive sinusoidal elements 205_a_-205_d_ may provide a circular polarization with a lower axial ratio. FIGS. 2A-2C may show a nested together embodiment.

Each of the plurality of conductive sinusoidal elements 205_a_-205_d_ has, prior to wrapping onto the cylinder, a shape defined by a sine function. In some embodiments, the sine function may comprise the integral region between (d/4) sin (2πf) and 0.8 (d/4) sin (2πf) and this may cause the plurality of conductive sinusoidal elements 205_a_-205_d_ to have a nonconstant trace width widening at peaks in the structural cycle. In other embodiments the plurality of conductive sinusoidal elements 205_a_-205_d_ may be a sine shaped trace of constant width or a wire. Where f is an operating frequency of the circular cylindrical antenna 202, and where d is a diameter of the circular cylinder 206. In other words, the structural amplitude of the plurality of conductive sinusoidal elements 205_a_-205_d_ is directly related to the operating radio frequency. The height (i.e., the thickness across the surface of the circular cylinder 206) of each of the amplitude of the plurality of conductive sinusoidal elements 205_a_-205_d_ is defined by the sine function noted hereinabove. In some embodiments, the plurality of conductive sinusoidal elements 205_a_-205_d_ may constitute wire-like conductive sinusoidal elements 205_a_-205_d_; therefore, this embodiment may comprise four sinusoidal wires extending upwards from the conductive ground plane 203.

As will be appreciated by one skilled in the art, first, second, third, and fourth signals fed into the plurality of conductive feeds 204_a_-204_d_ may, for circular polarization, have an excitation of equal amplitude and a progressive phasing of 360/n, where n=the number of conductive feeds. For n=4, the phase advance is 90° for each element and with an equal amplitude or power. For example, looking at an n=4 circular cylindrical antenna 202 from behind the conductive ground plane 203, and in the direction radiation, the excitation phase progresses in clockwise fashion with the plurality of conductive feeds 204_a_-204_d_ having phases of 0°, −90°, −180°, −270° to provide right hand circular polarization (RHCP).

Figure 2D:
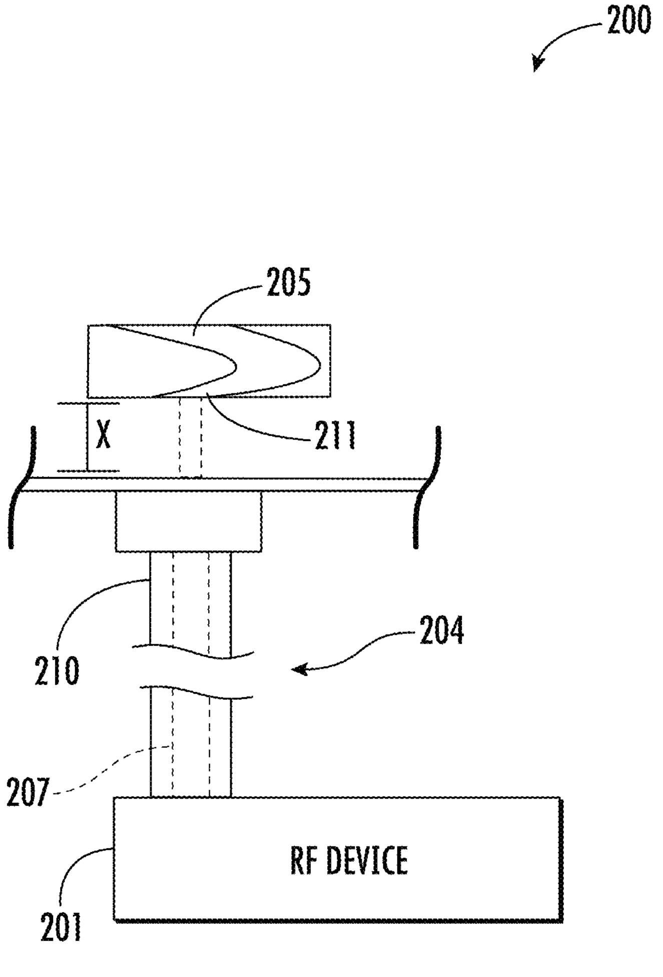
FIG. 2D is a schematic diagram of a conductive feed for the circular cylindrical antenna from the communications device of FIG. 2A.

Referring now additionally to FIG. 2D, for drawing clarity, only one of the plurality of conductive feeds 204 is shown. It should be appreciated that the other conductive feeds 204_a_-204_d_ have similar structure. The conductive feed 204 illustratively includes a coaxial cable feed coupling the RF device 201 and the circular cylindrical antenna 202. The coaxial cable feed illustratively comprises an inner conductor 207 and an outer conductor 210 surrounding the inner conductor. The outer conductor 210 is coupled to the conductive ground plane 203. The inner conductor 207 extends through the conductive ground plane 203 and is coupled to a proximal end 211 of the respective conductive sinusoidal element 205. The proximal end 211 of the at conductive sinusoidal element 205 defines a gap x with adjacent portions of the conductive ground plane 203.

Figure 3:
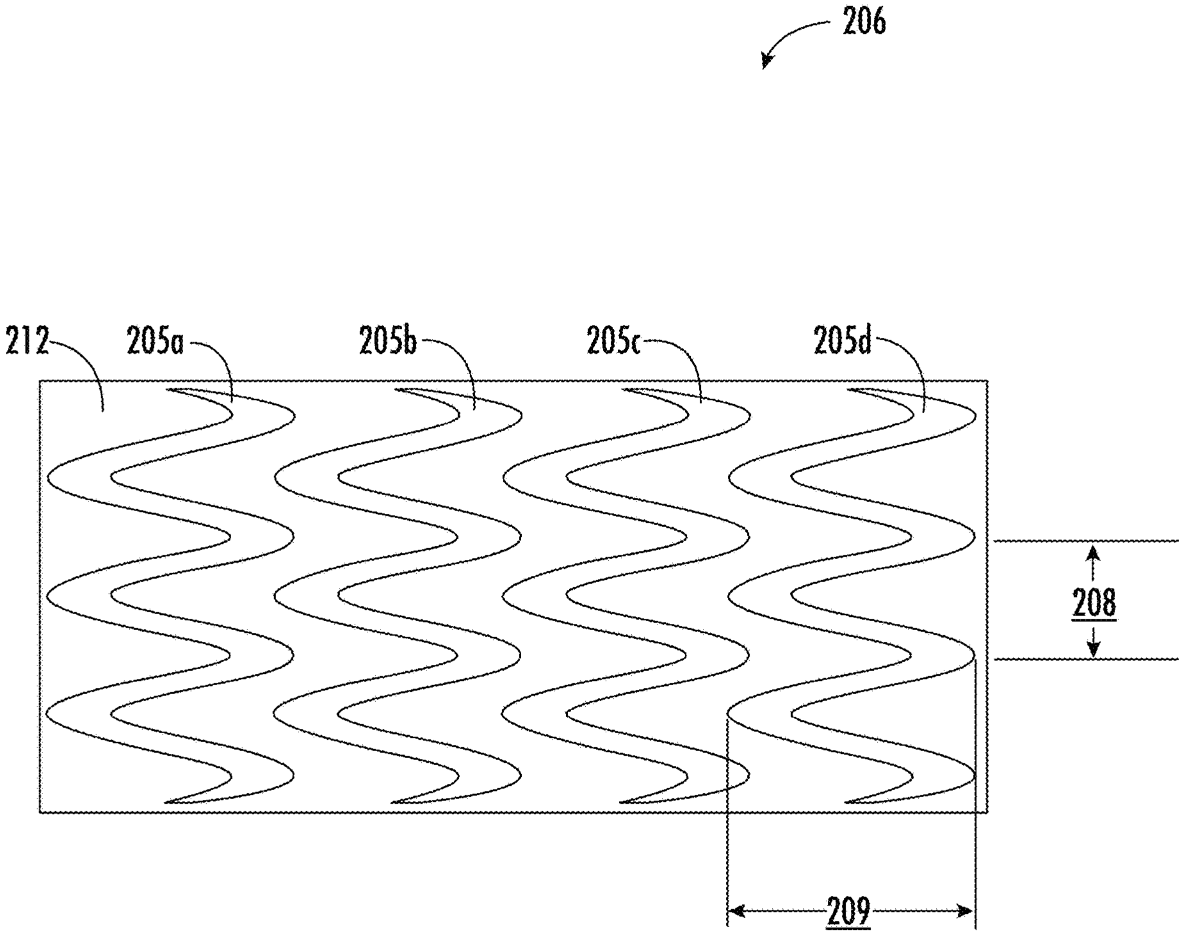
FIG. 3 is a top down plan view of dielectric substrate before being formed into the circular cylindrical antenna from the communications device of FIG. 2A.

Referring additionally to FIG. 3, with regards to spatial dimensions of the circular cylindrical antenna 202, these are defined by the operating wavelength of the communications device 200. The spatial dimensions may vary over a large range depending on frequency, desired realized gain, desired beamwidth, and the desired antenna radiation pattern. For 4 spaced apart conductive sinusoidal elements 205_a_-205_d_, a useful circular cylinder 206 diameter may be between 0.3 and 0.6 of the operating wavelength. The circular cylinder 206 may have a height between 0.5 and 20 or more operating wavelengths depending on realized gain requirements, and the structures of each of the plurality of conductive sinusoidal elements 205_a_-205_d_ may define a wave period or structural period 208 as shown in FIG. 3 between about 0.05 and 0.3 of the operating wavelength.

Referring now additionally to FIG. 3, the circular cylindrical antenna 202 illustratively comprises a circular cylindrical dielectric substrate 212, and each of the plurality of conductive sinusoidal elements 205_a_-205_d_ comprises a conductive trace on the circular cylinder dielectric substrate. For example, the circular cylindrical dielectric substrate 212 may comprise a flexible circuit board layer. Each of the conductive traces may have a thickness of at least two skin depths for the operating wavelength. In particular, the dielectric substrate is shown here before being formed into a cylinder. As will be appreciated, the conductive traces may be formed on the dielectric substrate using typical techniques, such as plating and etching. In other embodiments, the plurality of conductive sinusoidal elements 205_a_-205_d_ may be formed via an additive manufacturing process. Also, in some embodiments, the circular cylindrical dielectric substrate 212 may be swapped out for a dielectric cylinder base, and the conductive traces are formed on the dielectric cylinder base, for example, using additive manufacturing. Here, the structural period 208 is understood as the number of back and forth cycles per unit length in a conductive sinusoidal element 205_a_-205_d_. Although a constant structural period 208 is depicted, the structural period 208 may vary along the length of the conductive sinusoidal element 205_a_-205_d_ in some embodiments, such as to adjust radio wave speed to maximize directivity. Each of the plurality of conductive sinusoidal elements 205_a_-205_d_ has a structural amplitude 209 that defines a width of each conductive sinusoidal element 205_a_-205_d_. While a constant structural amplitude 209 is depicted in FIG. 3, some embodiments may have a varying or nonconstant structural amplitude 209 along the length of one or more of the plurality of conductive sinusoidal elements 205_a_-205_d_, such as for increased bandwidth.

Figure 4:
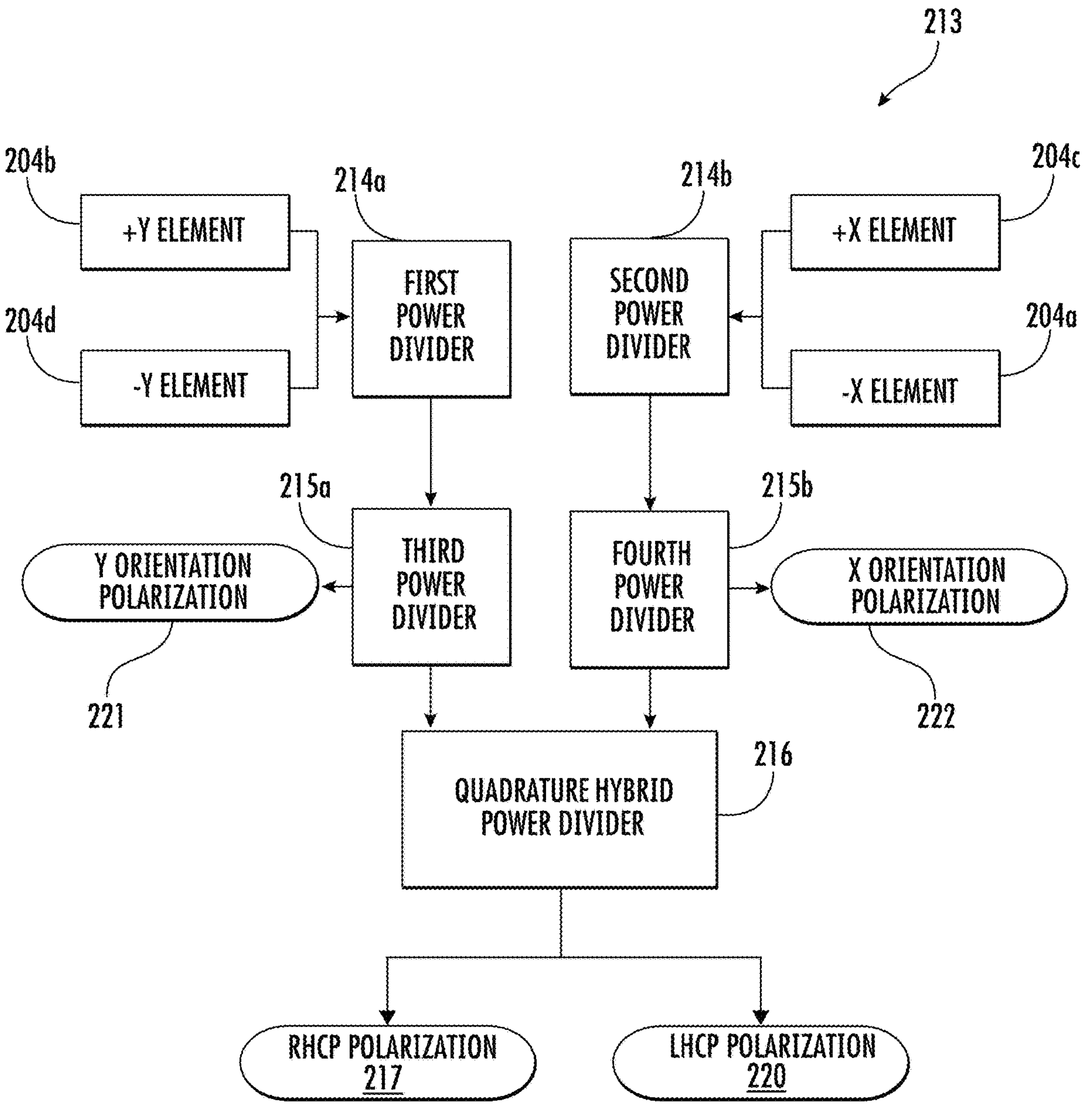
FIG. 4 is a schematic diagram of a multiple polarization feed network in the communications device of FIG. 2A.
Figure 5:
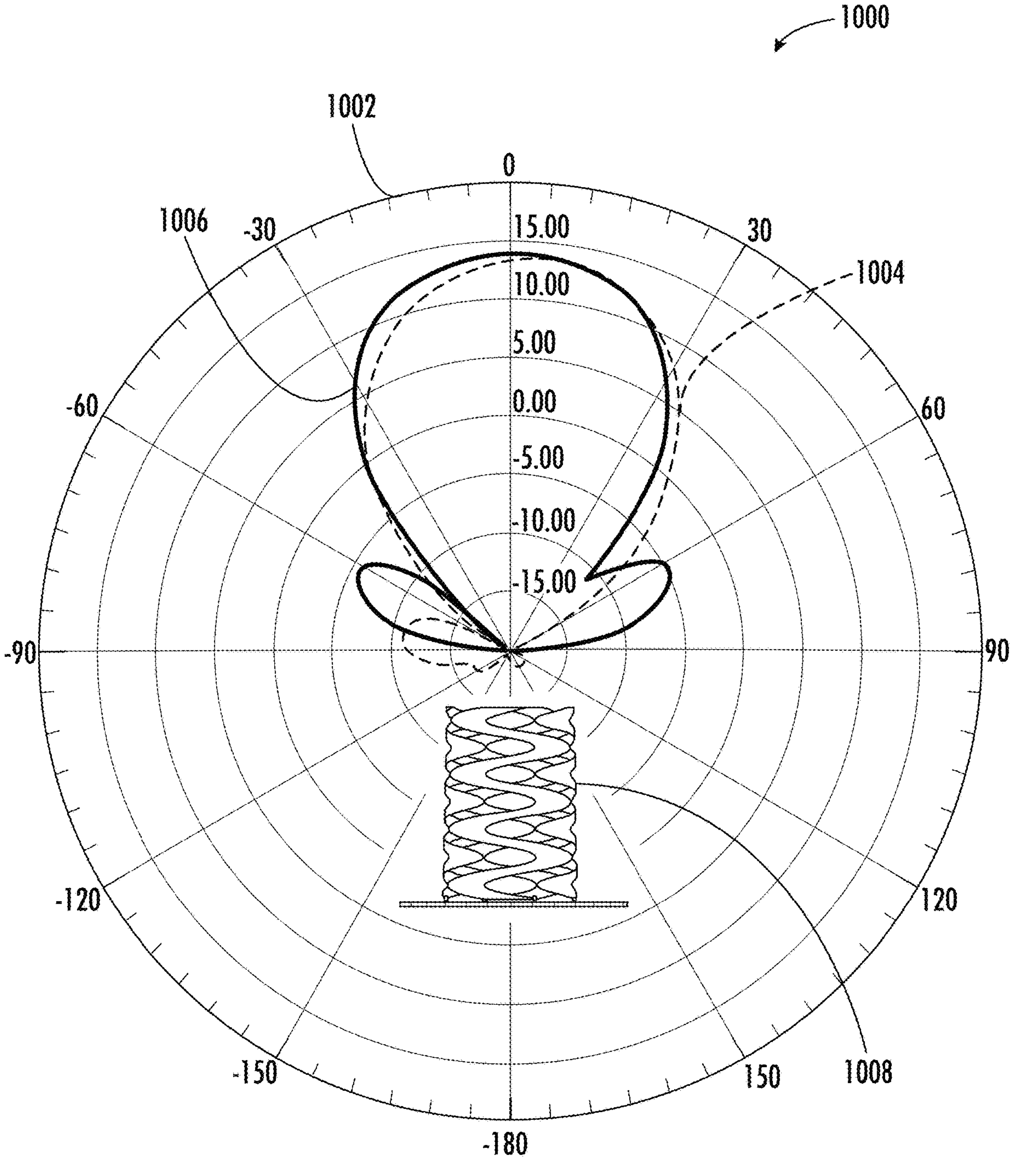
FIG. 5 is a radiation pattern diagram for the communications device of FIG. 2A.

Referring now additionally to FIG. 4, the communications device 200 may comprise a feed network 213 coupled between the RF device 201 and the circular cylindrical antenna 202. The feed network 213 illustratively comprises the plurality of conductive feeds 204_a_-204_d_, first and second power dividers 214_a_-214_b_ (e.g., 180° power dividers) coupled downstream from the plurality of conductive feeds, third and fourth power dividers 215_a_-215_b_ (e.g., power dividers or switches) coupled downstream from the first and second power divides, and a quadrature (90°) hybrid power divider 216 coupled downstream from third and fourth power dividers. In this exemplary configuration of the feed network 213, the RF device 201 may be configured to operate with the circular cylindrical antenna 202 in one or more of a RHCP 217, an LHCP 220, a first linear polarization 221, and a second linear polarization 222 different from the first linear polarization. As will be appreciated, the linear polarization type is based upon selection of a pair of feeds (i.e., only two feeds are driven in these polarization states). In some embodiments, portions of the feed network 213 may be omitted if fewer polarizations are needed.

Another aspect is directed to a method for making a circular cylindrical antenna 202 to be coupled to an RF device 201. The method comprises forming a conductive ground plane 203, and positioning a plurality of conductive feeds 204_a_-204_d_ associated with the conductive ground plane. The method also includes forming a plurality of conductive sinusoidal elements 205_a_-205_d_ to be coupled to the plurality of conductive feeds and extending outwardly from the conductive ground plane 203 along a circular cylinder 206.

Helpfully, the communications device 200 may be more flexible than prior art approaches, and may operate on multiple polarization modes with a single circular cylindrical antenna 202. Further, as compared to other approaches, for example, as disclosed in U.S. Pat. No. 4,658,262 to Duhamel, the communications device 200 may provide for a greater gain and narrower beamwidth. Regarding the approach of Duhamel, conical and planar shape antenna envelopes were advised only, with sharp pointy elements comprised of alternating concave and convex curve segment. Differently, the present invention uses cylindrical shape antenna envelopes, smooth elements without sharp points, and elements comprising sine shapes.

A relationship may exist between the axial mode helix antenna and the communications device 200. Shining a light through a helix may result in a sine like shape projected on a nearby wall. Projections of a helix on a cylindrical envelope may provide shapes similar to the plurality of conductive sinusoidal elements 205*a*-205*d*. Further, the 4 projections of a helix antenna taken in the +X, +Y, −X, −Y directions may be sufficient to synthesize any polarization. In cartesian coordinates, a helix may be defined by:

$$x(t) = \cos(t);$$

$$y(t) = \sin(t); \text{ and}$$

$$z(t) = t;$$

where t is parameter of structure growth.

A cylinder usefully reduces the amount of surface area needed for a given volume making for a space efficiency and small size in the communications device 200.

Table 1 provides a nonlimiting description of the parameters of the circular cylindrical antenna 202:

TABLE 1

Exemplary Specifications of the embodiment of FIG. 2A

| Parameter | Description | Comments |
|---|---|---|
| Circular cylindrical antenna 202 construction | Flexible circuit board wrapped into a cylinder | 0.005 inch thick polyimide substrate |
| Number of conductive circular sinusoidal elements 205a-205d | 4 | |
| Nominal center frequency | 1550 MHz | |
| Circular cylinder 206 diameter | 9.45 centimeters | 0.48λ |
| Circular cylinder 206 height | 12.1 centimeters | 0.63λ |
| Number of structural cycles in each conductive circular sinusoidal element 205a-205d | 2.9 | |
| Trace width of each of the conductive sinusoidal elements 205a-205d | 0.38 to 0.43 centimeters, widening at cycle peaks | |
| Structural period 208 of each of the conductive sinusoidal elements 205a-205d | Approximately 4.2 cycles per centimeter | A gap of X = 0.23 centimeters existed between the ground plane 203 and the bottom of the flexible circuit board. |
| Structural amplitude 209 of each the conductive sinusoidal elements 205a-205d | 7.1 centimeters | 0.37λ (Measured with flexible printed circuit board laid out flat) |
| Ground plane 203 diameter | 52 centimeters | Circular aluminum sheet construction (FIG. 2 showed a smaller diameter ground plane for clarity) |
| Plurality of conductive feeds 204a-204d | Chassis mount SMA connectors | Conductive circular sinusoidal elements 205a-205d were soldered to SMA connector center pins |
| Excitations of conductive circular sinusoidal elements 205a-205d for right hand circular polarization | Equal amplitude quadrature phasing, 1∠0°, 1∠−90°, 1∠−180°, 1∠−270° successively | |
| Circuit impedance of circular sinusoidal elements 205a-205d | Approximately Z = 61 + 19 j ohms | At 1550 MHz |
| Impedance matching provisions | None in this instance | Direct 50 ohm coaxial feed |
| Voltage standing wave ratio (VSWR) at the plurality of conductive feeds 204a-204d | 1.4 to 1 and under | At 1550 MHz |
| Radiation pattern | Single directive beam firing up the axis of the circular cylindrical antenna 202 | Similar to axial mode helix antenna |
| Realized gain | 12.6 dBic at 1550 MHz | Decibels with respect to isotropic, circular polarization. |
| 3 dB gain bandwidth | 18% | Increasable somewhat with external impedance matching (not shown). |
| 3 dB beamwidth | 42 degrees | |
| Sidelobes | 17 dB down from beam peak. | |

Of course, these parameters may be varied to suit particular requirements. The circular cylindrical antenna 202 may be increased in length for more realized gain at narrower beamwidth or reduced in length for less gain and greater beamwidth. The realized gain of the communications device 200 of FIG. 2A, Table 1 embodiment is favorable when compared to the Yagi-Uda antenna. Yagi-Uda antenna design and performance data may be obtained from the paper "Yagi Antenna Design", Peter P. Viezbicke, NBS Tech Note 688, National Bureau Of Standards (NBS), December 1976. This NBS reference discloses that a 0.63 wavelength tall Yagi Antenna may have a gain of 9.5 dBi. In contrast, a 0.63 wavelength circular cylindrical antenna 202 may provide 12.6 dBic when beamformer losses are not included.

Referring now additionally to FIGS. 5-8, several diagrams 1000, 1010, 1020, & 1030 show performance characteristics for an example embodiment of the communications device 200 (using the characteristics of Table 1). Diagram 1000 shows an elevation cut radiation pattern 1002 in polar coordinates and scaled in units of dBic or decibels with respect to isotropic for circular polarization fields. Here, polarization sense is righthand circular. The 4 elements of the plurality of conductive sinusoidal elements 205_a_-205_d_ of the circular cylindrical antenna 202 were fed in phase quadrature with currents of 1∠0°, 1∠−90°, 1∠−180°, 1∠−270° value respectively at the plurality of conductive feeds 204_a_-204_d_. The dashed trace 1004 was for 1500 MHZ, and the solid trace 1006 was for 1600 MHZ. Here, a directive single beam radiation pattern is formed along the circular cylindrical antenna 202 axis, which runs up and down the center of the antenna. The peak realized gain is 13.6 dBic, for example. The circular cylindrical antenna 202 is depicted in profile view 1008, which hopefully will assist in understanding orientation of the antenna with respect to the radiation pattern 1002. The beamwidth and the gain are selectively set by changing the length of the circular cylindrical antenna 202 and the number of structural cycles present in the plurality of conductive sinusoidal elements 205_a_-205_d_. Realized gains exceeding 20 dBic or more are possible. The circular cylindrical antenna 202 may provide realized gains similar too or perhaps exceeding those of the Yagi-Uda antenna at the same antenna length, and do so at more bandwidth. Back lobe amplitude may be determined by ground plane 203 diameter.

Figure 6:
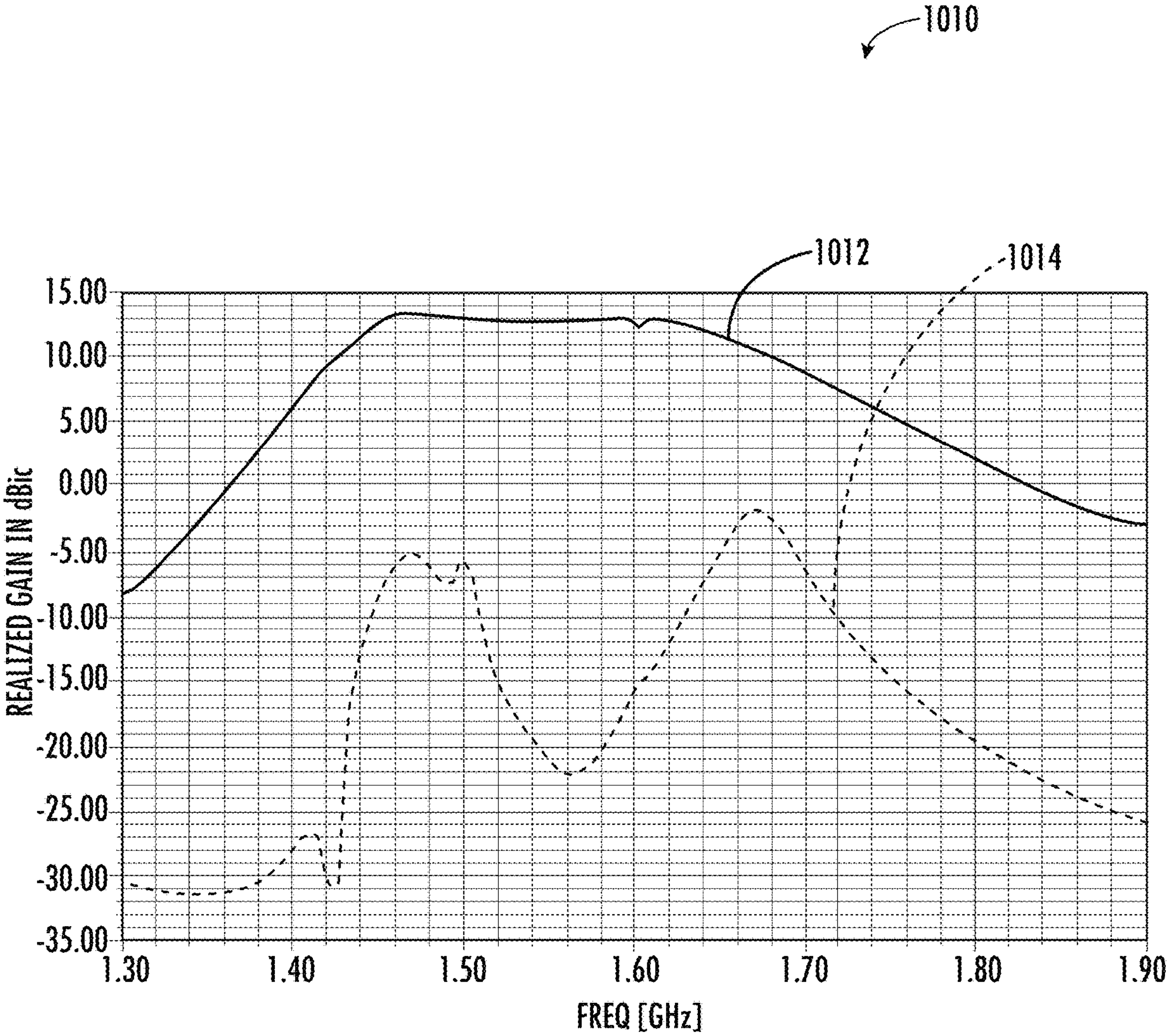
FIG. 6 is a diagram of realized gain versus frequency for the communications device of FIG. 2A.

FIG. 6 includes a diagram 1010, which shows a realized gain versus frequency curve for the example embodiment of FIG. 2A using the characteristics of Table 1 for the communications device 200. The solid trace 1012 is right hand circular polarization, and the dashed trace 1014 is for left hand circular polarization, making the diagram 1010 a single circular example. So, the diagram 1010 is for single polarization right hand circular. Possibly, the radiation bandwidth can be increased by external impedance matching (not shown).

Figure 7:
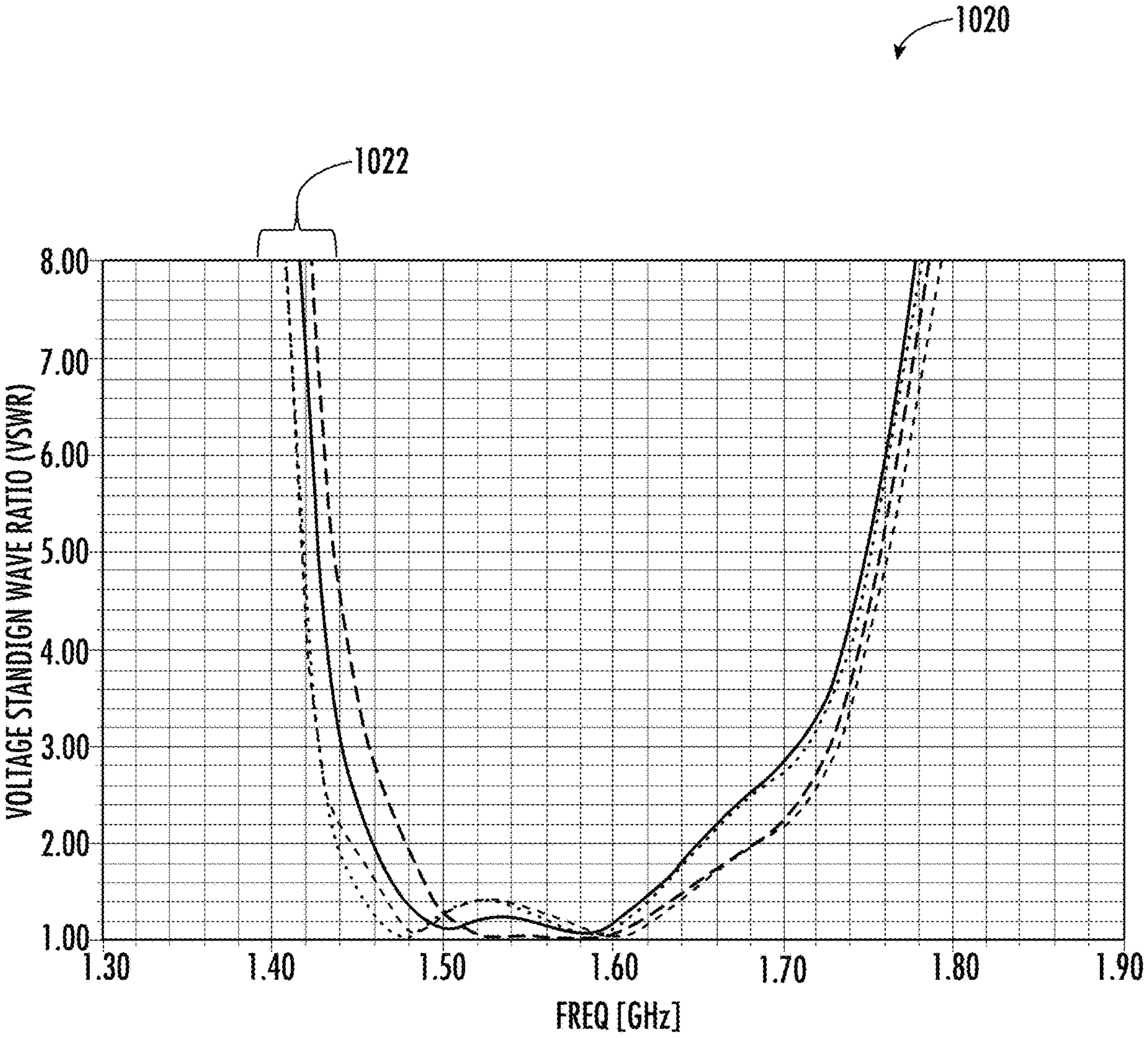
FIG. 7 is a diagram of VSWR for the communications device of FIG. 2A.

FIG. 7 includes a diagram 1020, which shows a family of 4 voltage standing ratio (VSWR) curves 1022 for the plurality of conductive feeds 204_a_-204_c_ of the example embodiment of FIG. 2A using the characteristics of Table 1 for the communications device 200. Here, 50 ohm coaxial feeds 204_a_-204_d_ were used without added impedance matching components. Since the curves 1022 are nearly on top of one individual conductive feeds 204_a_-204_c_ responses are not called out. As will be appreciated, the VSWR usefully drops under 2 to 1.

Figure 8:
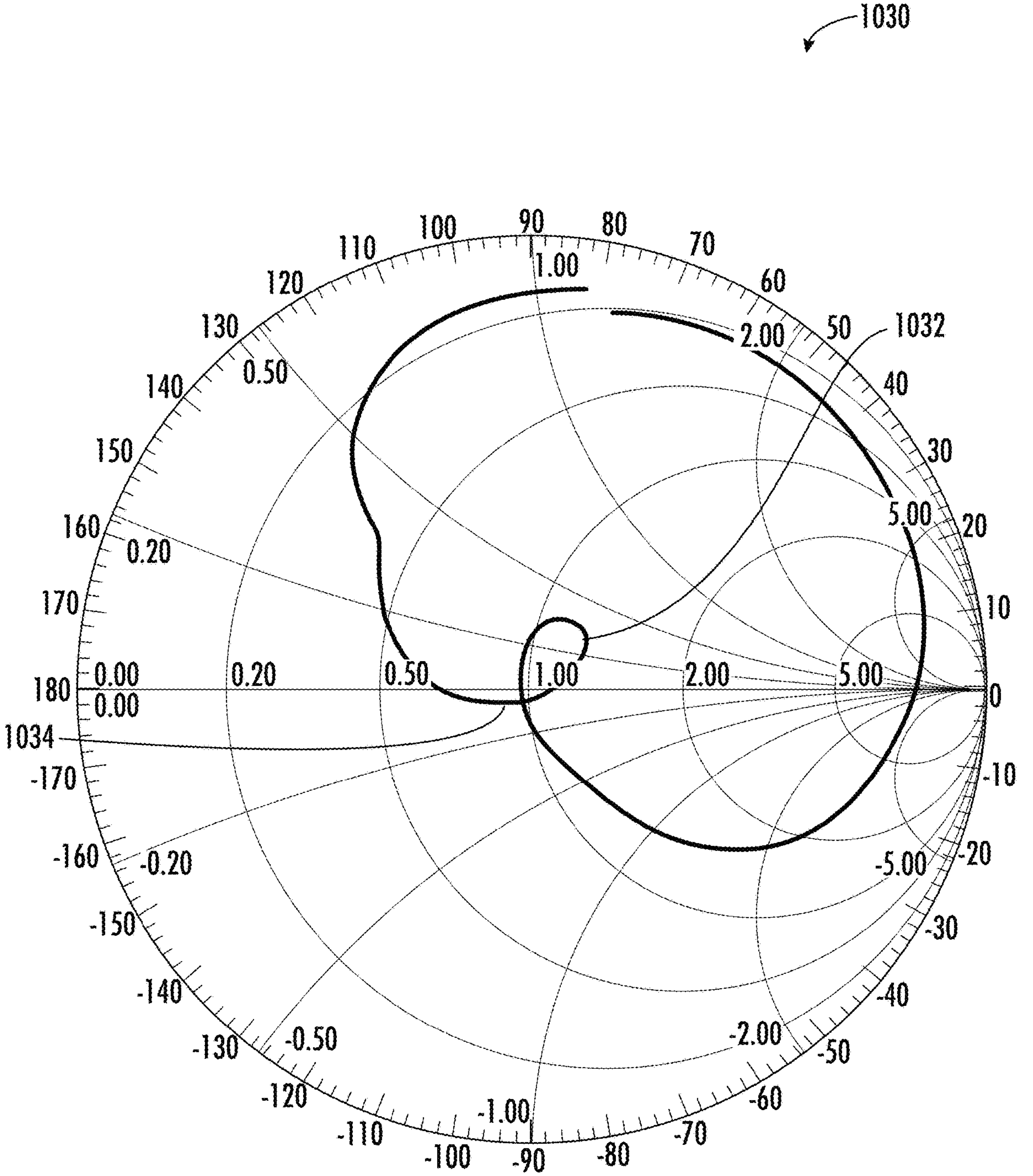
FIG. 8 is a Smith Chart diagram for the communications device of FIG. 2A at different operating frequencies.

FIG. 8 includes a diagram 1030, which shows a Smith diagram for the example embodiment of FIG. 2A using the characteristics of Table 1 for the communications device 200. The 4 traces are nearly on top of each other so one trace is shown. Diagram 1030 is for the frequency range of 1300 to 1900 MHz. The response loop 1032 is near 1520 MHz and includes a crossover region 1034. The diameter of response loop 1032 may be increased by increasing the structural period 208 of the plurality of conductive sinusoidal elements 205_a_-205_d_. Increasing the structural period 208: 1) broadens VSWR bandwidth and; 2) broadens VSWR passband ripple of the circular cylindrical antenna 202. Thus, the example embodiment of FIG. 2A using the characteristics of Table 1 for the communications device 200 is a Chebyshev response or "double tuned" antenna in which passband ripple may be traded for bandwidth as may be familiar from filter theory.

Figure 9:
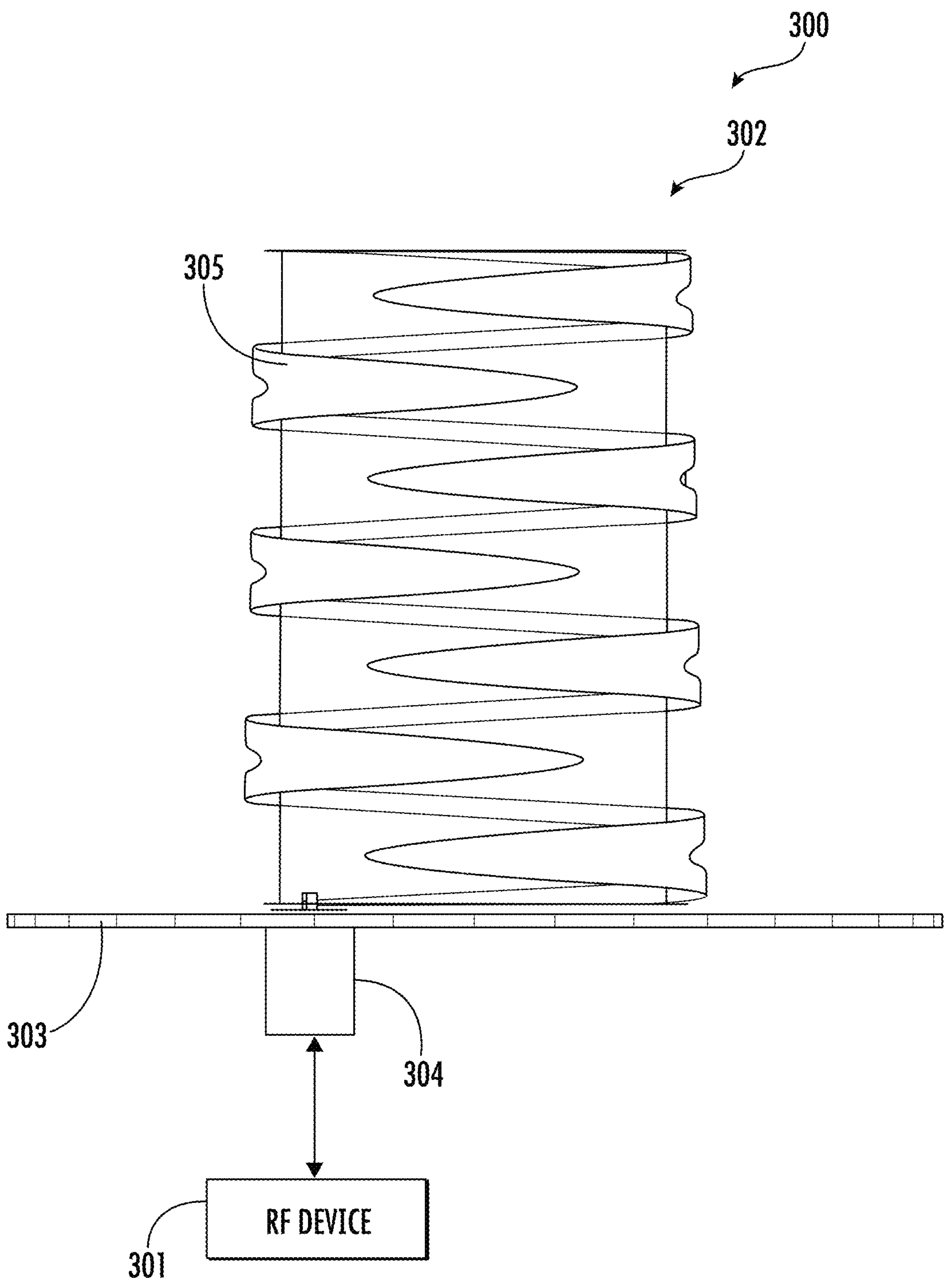
FIG. 9 is a side view of a communications device, according to a second example embodiment of the present disclosure.

Referring now additionally to FIG. 9, another embodiment of the communications device 300 is now described. In this embodiment of the communications device 300, those elements already discussed above with respect to FIGS. 2A-2D are incremented by 100 and most require no further discussion herein. This embodiment differs from the previous embodiment in that this communications device 300 illustratively includes a single conductive feed 304 and a single conductive sinusoidal element 305. In this embodiment, the single conductive sinusoidal element 305 has an increased structural amplitude 209 characteristic to provide the necessary height in the element to define the circular cylinder.

Figure 10:
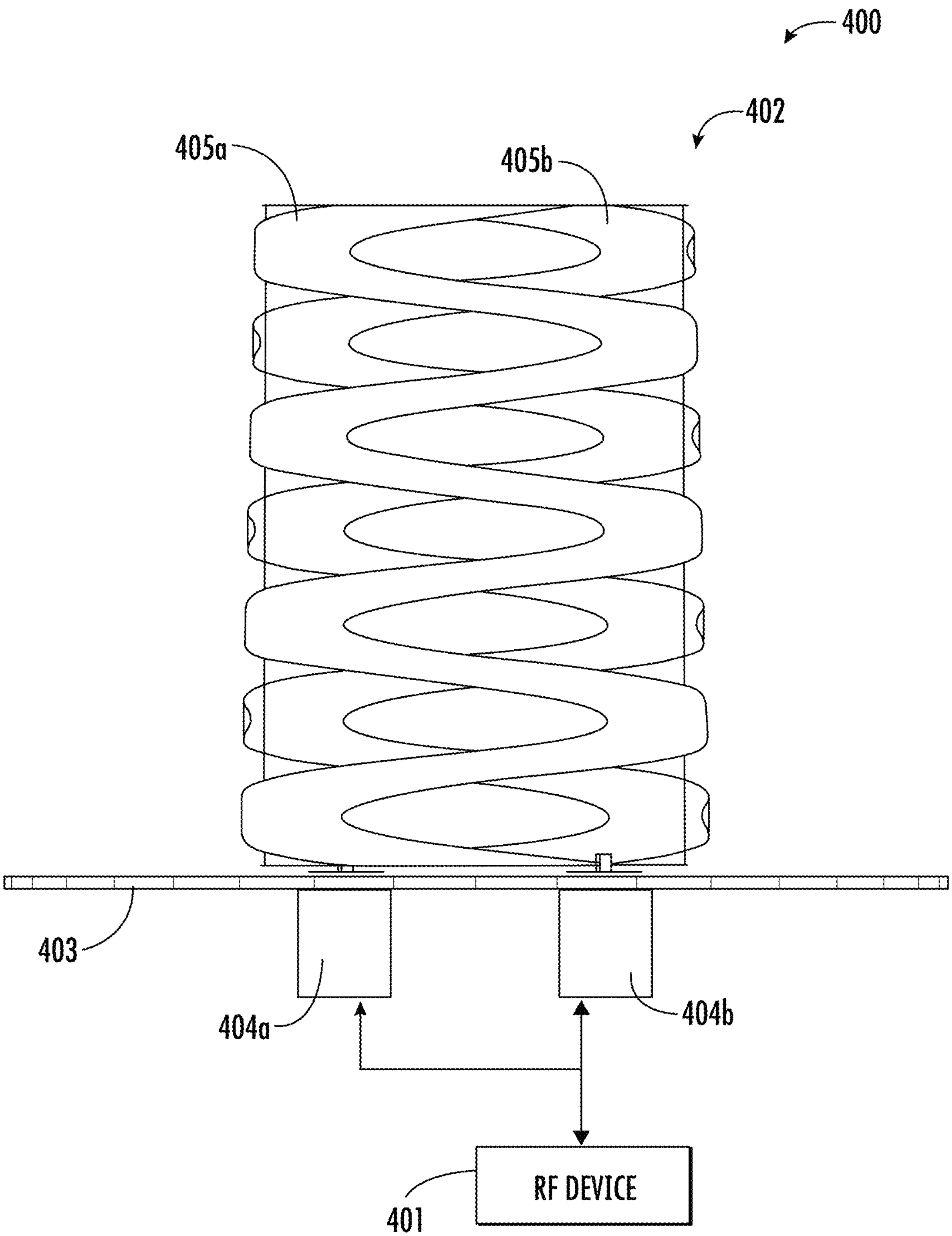
FIG. 10 is a side view of a communications device, according to a third example embodiment of the present disclosure.

Referring now additionally to FIG. 10, another embodiment of the communications device 400 is now described. In this embodiment of the communications device 400, those elements already discussed above with respect to FIGS. 2A-2D are incremented by 200 and most require no further discussion herein. This embodiment differs from the previous embodiment in that this communications device 400 illustratively includes first and second conductive feeds 404_a_-404_b_ and first and second conductive sinusoidal elements 405_a_-405_b_ radially spaced apart by 180° and respectively coupled to the first and second conductive feeds. As will be appreciated, first and second signals fed into the first and second conductive feeds 404_a_-404_b_ may have a phase spacing of 180°.

Figure 11:
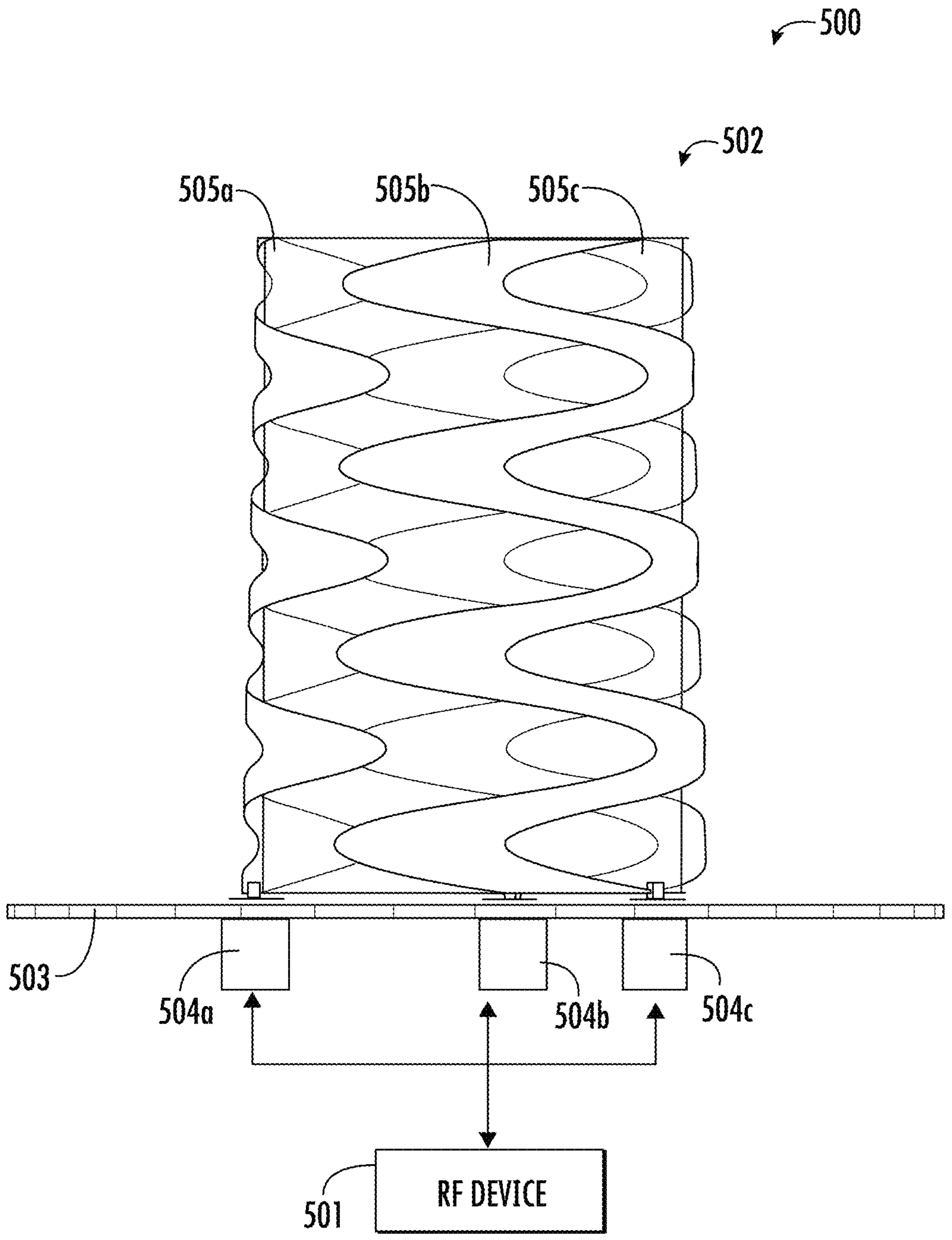
FIG. 11 is a side view of a communications device, according to a fourth example embodiment of the present disclosure.

Referring now additionally to FIG. 11, another embodiment of the communications device 500 is now described. In this embodiment of the communications device 500, those elements already discussed above with respect to FIGS. 2A-2D are incremented by 300 and most require no further discussion herein. This embodiment differs from the previous embodiment in that this communications device 500 illustratively includes first, second, and third conductive feeds 504_a_-504_c_ and first, second, and third conductive sinusoidal elements 505_a_-505_c_ radially spaced apart by 120° and respectively coupled to the first, second, and third conductive feeds. As will be appreciated, first, second, and third signals fed into the first, second, and third conductive feeds 504_a_-504_c_ may have a phase spacing of 120°.

Figure 12A:
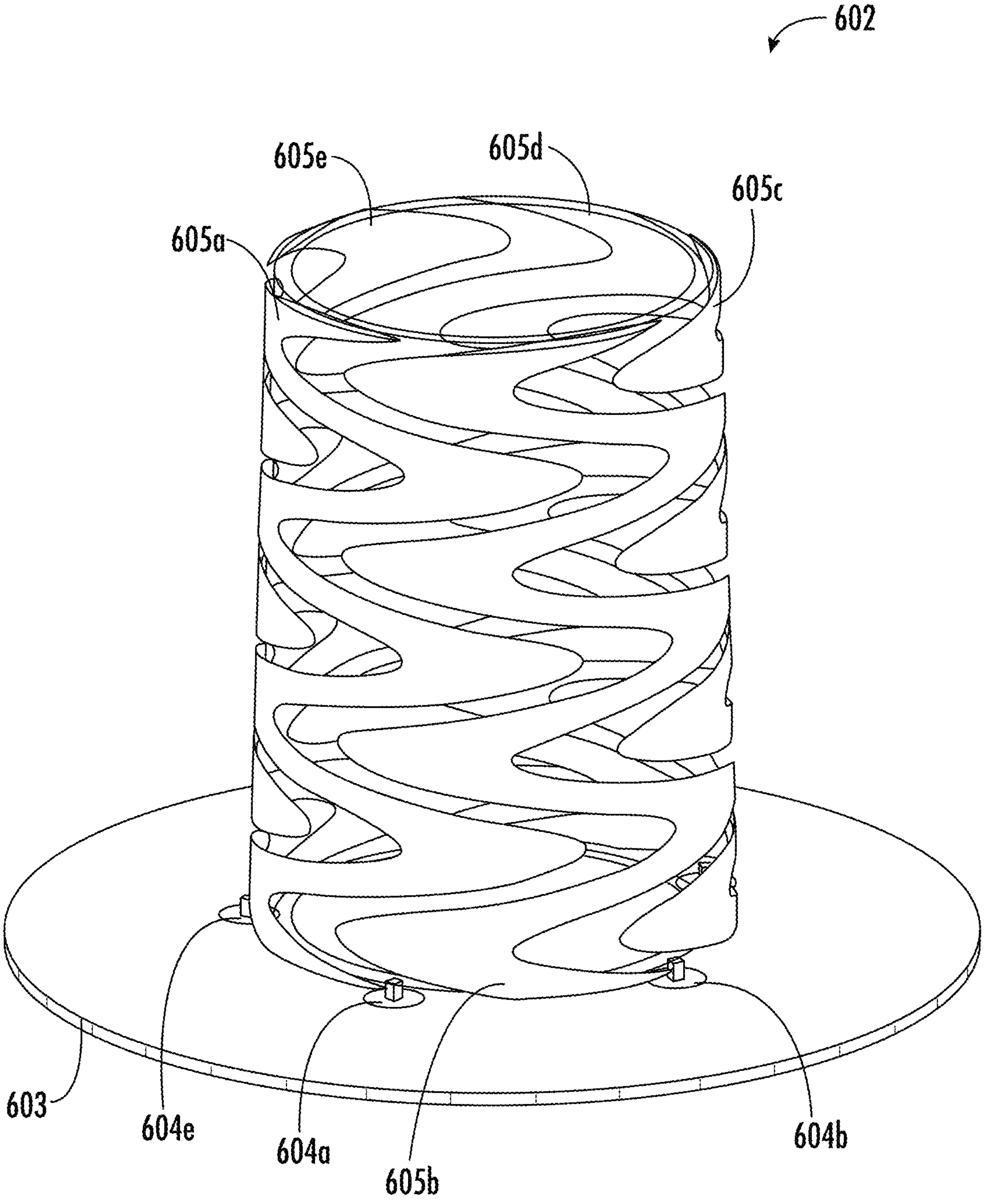
FIG. 12A is a perspective view of a communications device, according to a fifth example embodiment of the present disclosure.
Figure 12B:
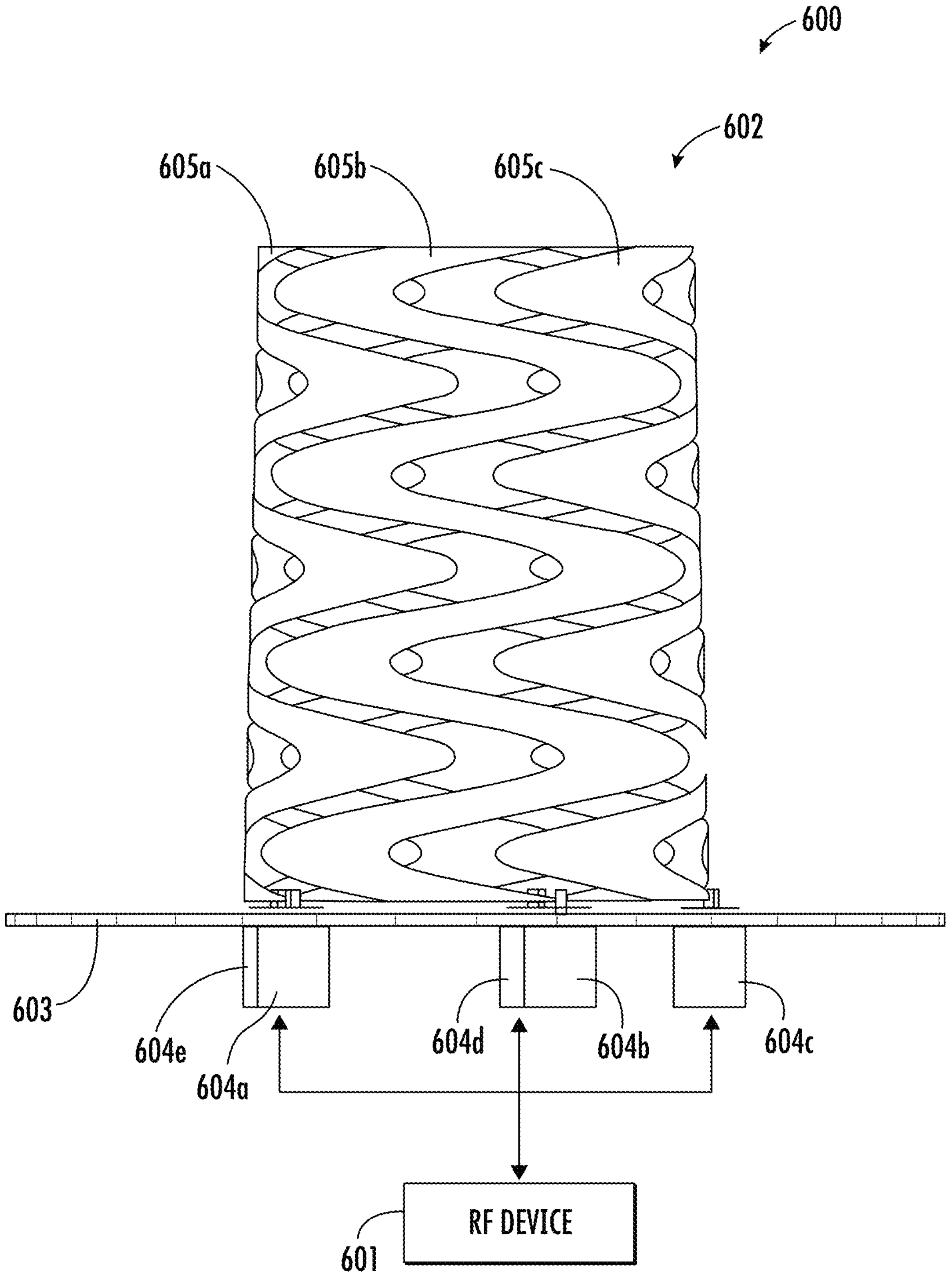
FIG. 12B is a side view of the circular cylindrical antenna from the communications device of FIG. 12A.

Referring now additionally to FIGS. 12A-12B, another embodiment of the communications device 600 is now described. In this embodiment of the communications device 600, those elements already discussed above with respect to FIGS. 2A-2D are incremented by 400 and most require no further discussion herein. This embodiment differs from the previous embodiment in that this communications device 600 illustratively includes first, second, third, fourth, and fifth conductive feeds 604_a_-604_e_ and first, second, third, fourth, and fifth conductive sinusoidal elements 605_a_-605_e_ radially spaced apart by 72° and respectively coupled to the first, second, third, fourth, and fifth conductive feeds. As will be appreciated, first, second, third, fourth, and fifth signals fed into the first, second, third, fourth, and fifth conductive feeds 604_a_-604_e_ may have a phase spacing of 72°.

Unlike the prior art axial mode helix antenna, in the present embodiments, the sense of polarization is determined by the mode and sense of excitation rather than being enforced in only one way by antenna structure. Thus, many options exist as to the number of sinusoidal elements 605_a_-605_e_. Table 2 provides a partial list:

TABLE 2

Partial List of Configurations and Polarizations

| Number of conductive sinusoidal elements 205a-205d | Structural location of conductive sinusoidal elements 205a-205d about circular cylinder 206, e.g., clocking | Excitations At Conductive Feeds 204 | Polarization |
|---|---|---|---|
| 1 | Any | 1∠0° | Single channel |

TABLE 2-continued

Partial List of Configurations and Polarizations

| Number of conductive sinusoidal elements 205a-205d | Structural location of conductive sinusoidal elements 205a-205d about circular cylinder 206, e.g., clocking | Excitations At Conductive Feeds 204 | Polarization |
|---|---|---|---|
| | | | linear |
| 2 | 0°, 180° | 1 ⌊0°, 1 ⌊180° | Single channel linear |
| 3 | 0°, 120°, 240° | 1 ⌊0°, 1 ⌊−120°, 1 ⌊−240° | Single channel right hand circular |
| 4 | 0°, 90°, 180°, 270° | 1 ⌊0°, 1 ⌊−90°, 1 ⌊−180°, 1 ⌊270° | Single channel right hand circular |
| 5 | 0°, 72°, 144°, 216°, 288° | 1 ⌊0°, 1 ⌊72°, 1 ⌊144°, 1 ⌊216°, 1 ⌊288° | Single channel right hand circular |
| 4 | 0°, 90°, 180°, 270° | Linear polarization channel 1: 0° and 180° drive to elements clocked 0° and 180°. Cross linear polarization channel 2: 0° and 180° drive to elements clocked 90° and 270°. | Dual linear |

It is possible to use more than 5 conductive sinusoidal elements 205*a*-205*d* for increased directivity and gain with a large diameter circular cylinder 206, for polarization, of for radiation pattern synthesis. Only single polarizations are described in Table 2. Dual circular polarizations may be accomplished with an external quadrature hybrid power divider(s) to divide the RF power to the conductive sinusoidal elements. Quadrature hybrid power dividers internally circulate traveling wave energies useful to synthesize circular polarization and sort the left and right hand polarization senses. Delay lines may also be used to synthesize circular polarization from a radial or corporate RF power divider.

Figure 13:
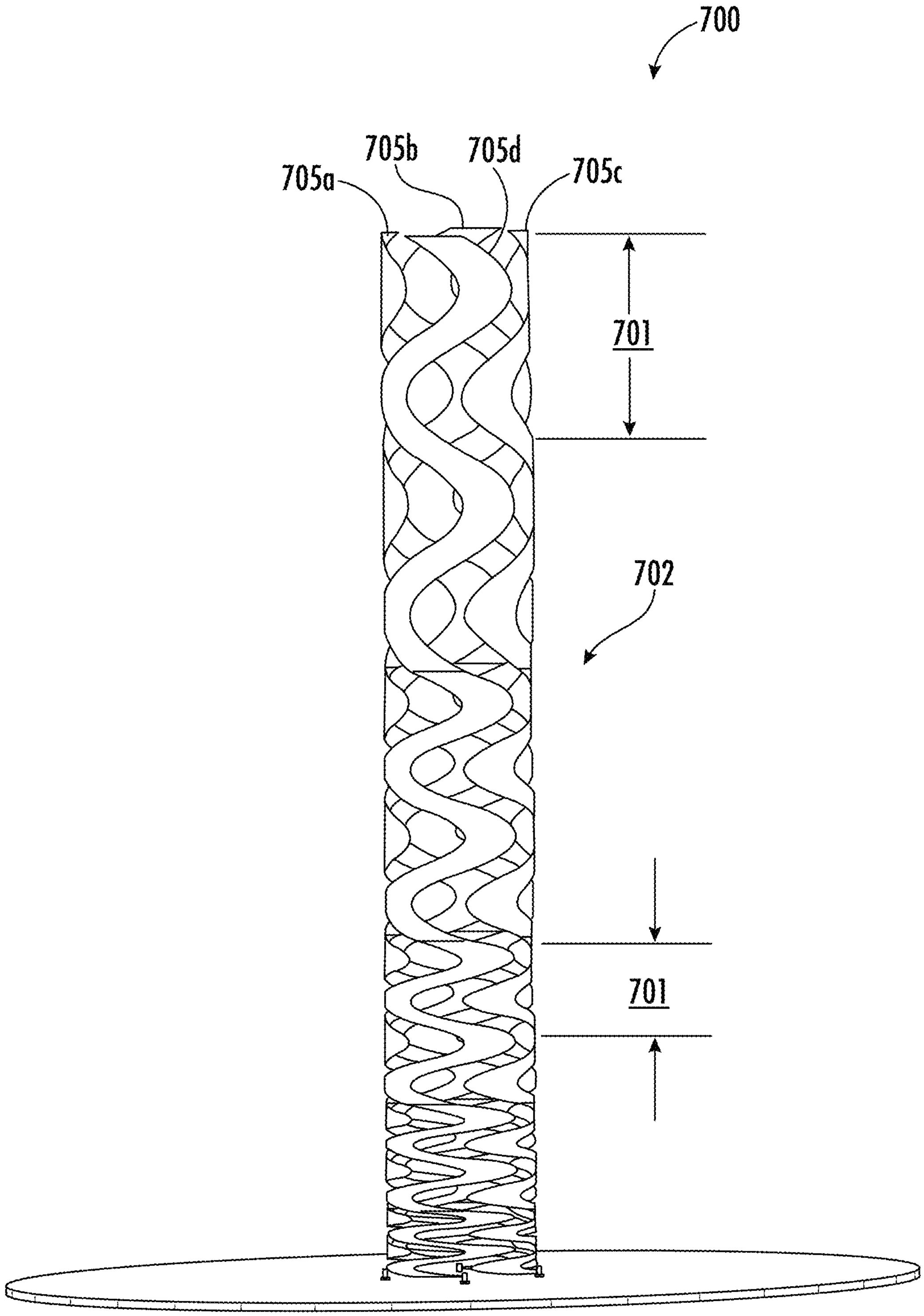
FIG. 13 is a side view depicting a variable pitch circular cylindrical antenna, according to a sixth example embodiment of the present disclosure.
Figure 14A:
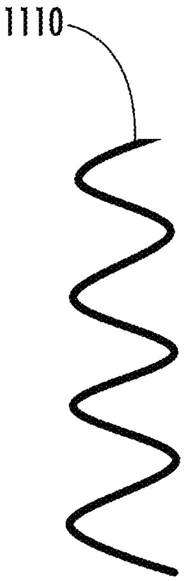
FIG. 14A-14D are side views of slot, panel and fill variations of the elements used in the communications device, according to the present disclosure.
Figure 14B:
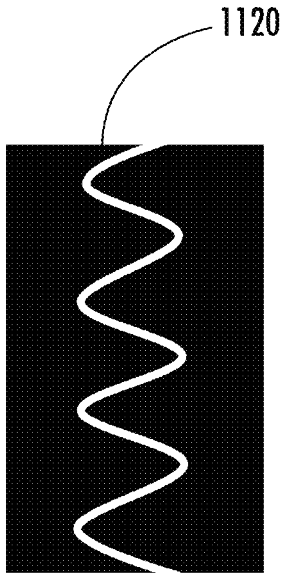
Figure 14C:
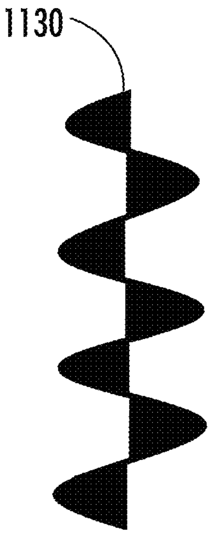
Figure 14D:
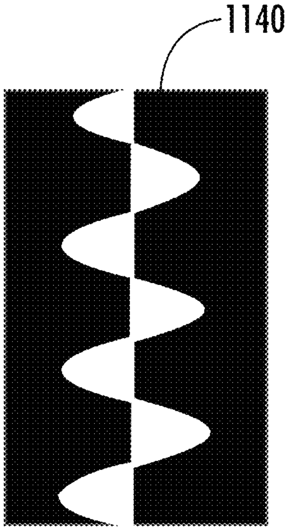
Figure 15A:
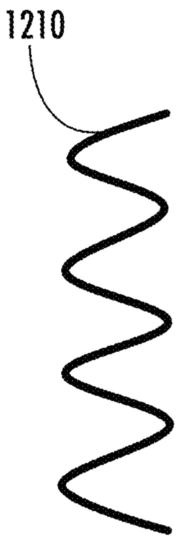
FIGS. 15A-15H depict polygonal and fractal embodiments of the elements used in the communications device, according to the present disclosure.
Figure 15B:
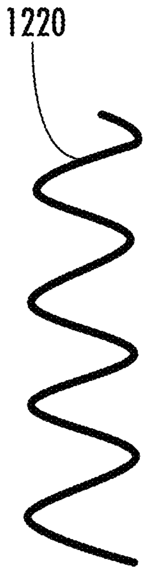
Figure 15C:
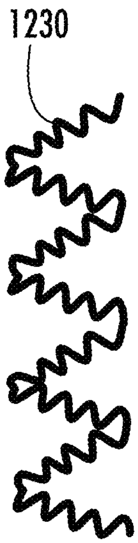
Figure 15D:
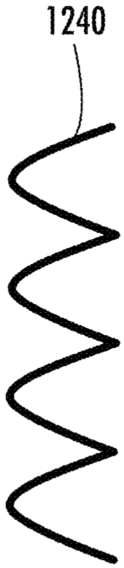
Figure 15E:
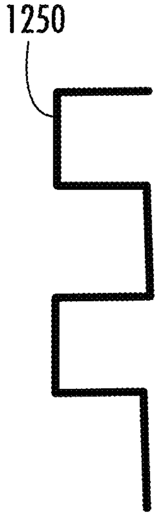
Figure 15F:
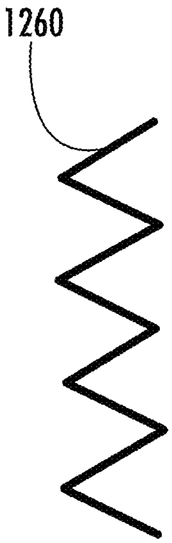
Figure 15G:
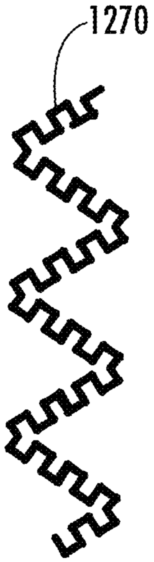
Figure 15H:
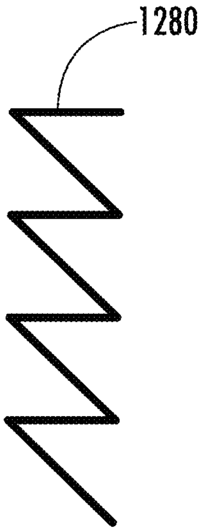

Referring now additionally to FIG. 13, another embodiment of the communications device 700 is now described. The communications device 700 illustratively includes a varying structural period 701 embodiment cylindrical antenna 702. There are more structural cycles per axial length of the antenna 702 at the bottom and fewer structural cycles per axial length at the top or radiating end of the antenna 702. This varying rate of structural period 701 increases gain and reduce sidelobes in taller cylindrical antennas 702. The varying rate of structural period 701 in the sinusoidal elements 705*a*-705*d* varies the propagation velocity of the electromagnetic energies along the length of the antenna 702, those energies being the electric fields E, magnetic fields H, and electric currents I. In a tall cylindrical antenna 702, the E and H fields may vary in speed from about ⅓ the speed of light (0.33 c) at the proximal end to nearly the speed of light say (0.9 c) at the top radiating end. Cylindrical antenna 702 is slow wave, traveling wave and surface wave device as the cylindrical antenna 702: 1) transduces the developing radio wave fields from electric currents I; 2) captures and conveys the developing radio wave fields axially along the cylindrical antenna 702 structure and; 3) expands and releases the E and H fields smoothly at the radiating end to synthesize an aperture.

The varying structural period 701 controls the axial velocity of the electric currents I relative the axial velocity of the electric fields E and magnetic fields H. To advance axially, the electric currents have to move back and forth over a path longer than the E and H fields have to take. Further, varying structural period 701 may benefit adjustment of driving impedance z=r+jx. A slow varying structural period 701 at the start may reduce driving resistance r, and a fast varying structural period 701 at the start may increase driving resistance r. Constant structural period sinusoidal elements 705*a*-705*d* may have sidelobes of near 13 dB down from the main, on axis lobe. Varying structural period 701 sinusoidal elements 705*a*-705*d* may have sidelobes 17 to 22 dB down from the main lobe. Radiation predominately occurs from the distal end and not from lower regions of the cylindrical antenna 702 when well adjusted. Phase dispersion and group delay are minimized by holding the forming radio wave to the cylindrical antenna 702 structure until the antenna radiating end is reached.

Referring to FIGS. 14A-14D, additional embodiments of the communications device 200 of FIG. 2A are shown. In this diagram, the color black denotes an electrical conductor material, such as metal, and the color white denotes electrical insulator material, such as vacuum, air or plastic. For drawing clarity purposes only, one conductive sinusoidal element is shown, and it is understood that any number of conductive sinusoidal elements may be provided on the antenna cylindrical envelope. A conductive sinusoidal element 1110 has been described previously and is shown for reference. The conductive sinusoidal element 1120 may be considered a skeletal embodiment. Differently, in conductive sinusoidal element 1120, the area around the sinusoidal element(s) is electrically conductive and the conductive sinusoidal elements are air or an insulator material. So, the insulator and the conductor are reversed. In the conductive sinusoidal element 1130, the area under the conductive sinusoidal element is made electrically conductive. The conductive sinusoidal element 1140 depicts an embodiment in which the sinusoidal elements are air or insulative material in a metal conductive surroundings, as may benefit structural needs.

While sinusoidal shape conductive elements have been discussed thus far it is understood that approximation shapes may be used for the conductive elements. Referring to the FIGS. 15A-15H, polygonal and fractal embodiments of the elements used in the communications device 200 are now shown. Electrical conductors of FIGS. 15A-15H are shown in black. The conductive element 1210 shows a sine shape conductive element as described previously for reference. The conductive elements 1220 is a sine shape conductive element shifted in the start of electrical phase by shifting structural position as may benefit polarization synthesis or impedance matching. The conductive elements 1230 depicts a fractal sine wave conductive element comprising many small reversal in direction or subcycles, which may benefit tuning or miniaturization. The conductive element 1240 depicts a half cycle or rectified wave series conductive element, which may benefit pattern shaping. The conductive element 1250 depicts a square wave conductive element, which advances in discrete steps as may benefit manufacture or size reduction. The conductive element 1260 is a triangular or sawtooth waveform conductive element, which may be simpler to manufacture. The conductive element 1270 depicts a fractal or linearly loaded conductive element, which may reduce size. Indeed, the conductive element 205*a*-205*d* may be approximated by polygons or a polygonal mesh. For example, the conductive element 1280 depicts a serrasoid conductive element 205*a*-205*d*.

Figure 16A:
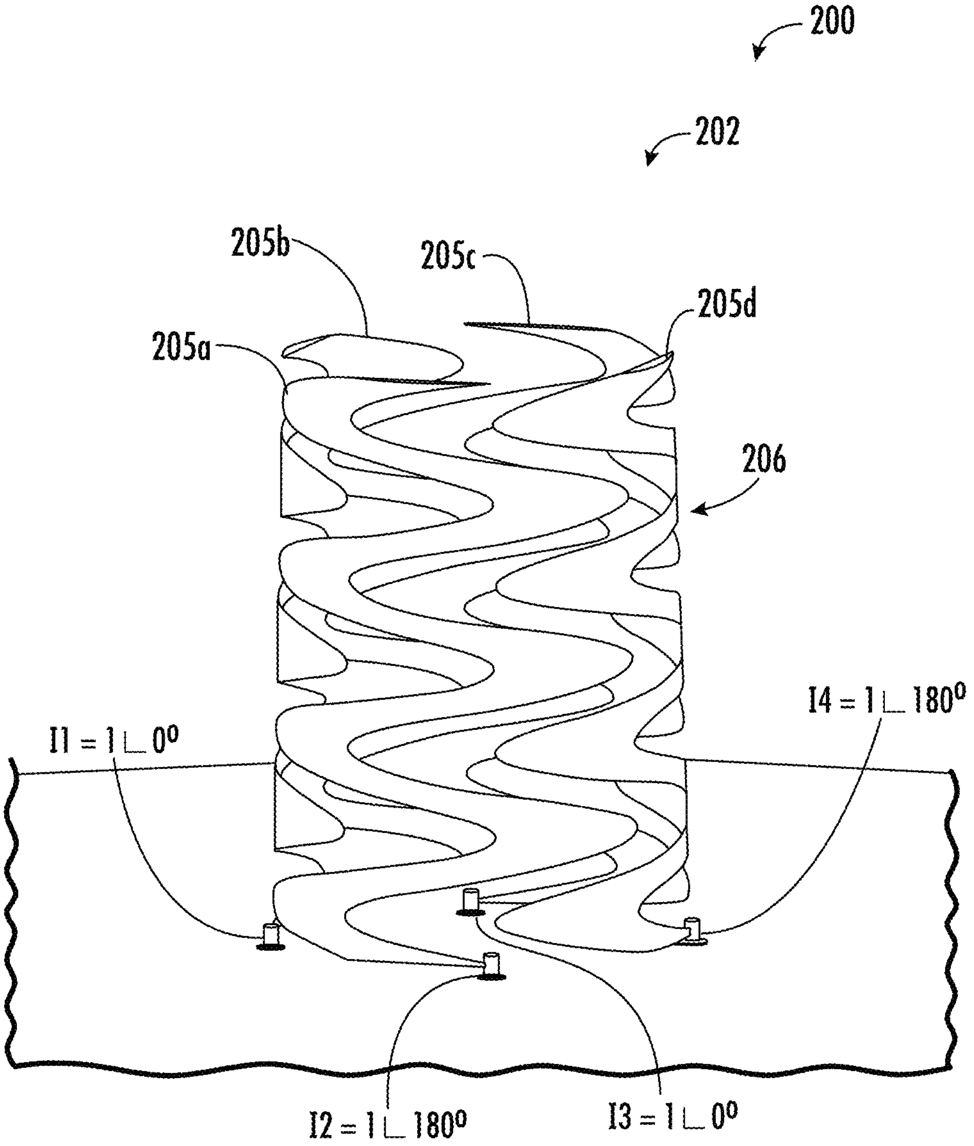
FIG. 16A shows an electrical excitation for the communications device of FIG. 2A producing an axial null radiation pattern.
Figure 16B:
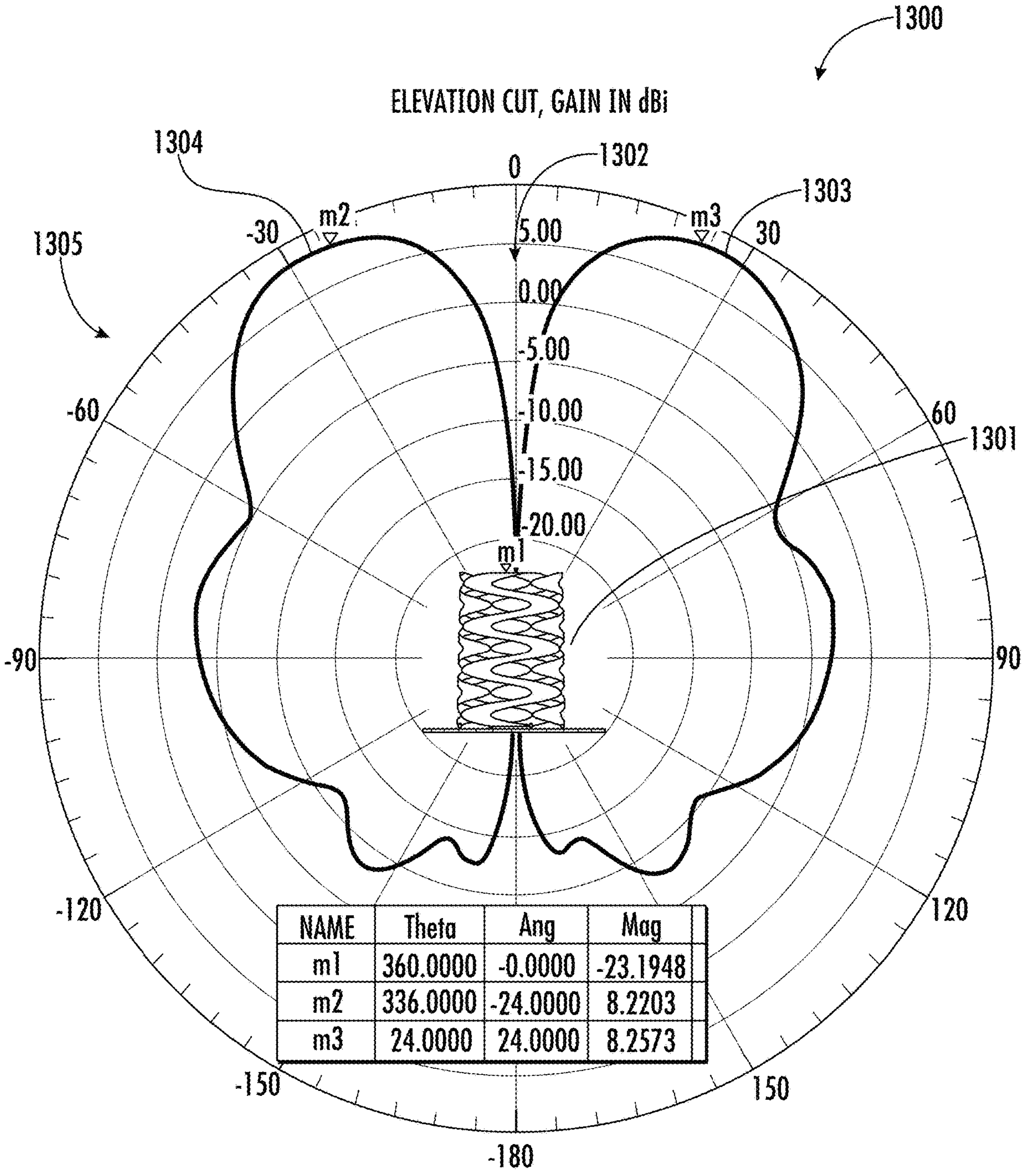
FIG. 16B is a diagram of the axial null radiation pattern provided by the FIG. 16A.

Referring now additionally to FIG. 16A, the embodiment of the communications device 200 from FIGS. 2A-2D is now described with a different radiation pattern shape having an axial null. Here, unlike before in FIGS. 2A-2D, they are provided with electrical excitations of I=1⌊0°, I=1⌊180°, I=1⌊0°, and I=1⌊180° sequentially around the cylindrical antenna envelope. Therefore, the total electrical excitation phase advance around the circular cylinder 206 is now 2 (360°)=720°. FIG. 16B includes a diagram 1300 showing a radiation pattern that plots the gain of the embodiment of FIG. 16A circular cylindrical antenna as a function of elevation angle θ. Feature 1301 is a profile view of the circular cylindrical antenna for orientation. A deep skirted radiation pattern null 1302 is seen along the axis of the circular cylinder and radiation pattern lobes 1303, 1304 occur approximately +−25° off the axis of the circular cylindrical antenna. In three dimensional viewing, a conical radiation pattern is formed. A diagram 1305 radiation pattern may aid direction finding, tracking or monopulse as a small signal source movement off the circular cylindrical antenna axis produces a large signal change. More than n=4 conductive circular sinusoidal elements may be used to form an axial null embodiment (FIGS. 16A-16B) and again the excitation phasing occurs at twice the angular rate of the axial lobe embodiment of FIGS. 2A-2D. For example, a circular cylindrical antenna having n=8 conductive circular sinusoidal elements (not shown) would have successive excitations of 1⌊0°, 1⌊90°, 1⌊180°, 1⌊270°, 1⌊360°, 1⌊450°, 1⌊540°, 1⌊630°, and if the modulus of 360° is subtracted, 1⌊0°, 1⌊90°, 1⌊180°, 1⌊270°, 1⌊0°, 1⌊90°, 1⌊180°, 1⌊270°. Increasing numbers of conductive circular sinusoidal elements will reduce axial ratio and improve the quality of circular polarization.

The diameter of the circular cylindrical antenna in the radiation pattern FIB. 16B was 0.4 wavelengths; however, the range of circular antenna diameters may range from 0.1 wavelengths to 10 or more wavelengths depending on the number of circular sinusoidal elements and the desired compaction. The prior art axial mode helix antenna may not provide an axial null radiation pattern in the size and manner that the circular cylindrical antenna does. Hopefully, the present disclosure wave antenna may provide a replacement for the common art axial mode helix antenna when needs of dual polarization, linear polarization, axial lobe radiation patterns, axial null radiation patterns and higher realized gains are required.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A communications device comprising:

a radio frequency (RF) device; and a circular cylindrical antenna coupled to the RF device and comprising a conductive ground plane, at least one conductive feed associated with the conductive ground plane, and at least one conductive sinusoidal element coupled to the at least one conductive feed and extending outwardly from the conductive ground plane along a circular cylinder.

2. The communications device of claim 1 wherein the at least one conductive sinusoidal element comprises a plurality of conductive sinusoidal elements; and wherein the at least one conductive feed comprises a plurality of conductive feeds with a respective conductive feed coupled to each conductive sinusoidal element.

3. The communications device of claim 2 wherein the plurality of conductive sinusoidal elements comprises four conductive sinusoidal elements equally-sized and arranged about the circular cylinder.

4. The communications device of claim 2 wherein the RF device is configured to operate with the circular cylindrical antenna in at least one of a right-handed circular polarization (RHCP), a left-handed circular polarization (LHCP), a first linear polarization, and a second linear polarization different from the first linear polarization.

5. The communications device of claim 2 wherein adjacent ones of the plurality of conductive sinusoidal elements are nested together.

6. The communications device of claim 1 wherein the circular cylindrical antenna comprises a circular cylindrical dielectric substrate; and wherein the at least one conductive sinusoidal element comprises at least one conductive trace on the circular cylinder dielectric substrate.

7. The communications device of claim 1 wherein the conductive ground plane has a width greater than a diameter of the circular cylinder.

8. The communications device of claim 1 wherein the at least one conductive feed comprises at least one coaxial cable feed coupling the RF device and the circular cylindrical antenna, the at least one coaxial cable feed comprising an inner conductor and an outer conductor surrounding the inner conductor; wherein the outer conductor is coupled to the conductive ground plane; and wherein the inner conductor extends through the conductive ground plane and is coupled to a proximal end of the at least one conductive sinusoidal element.

9. The communications device of claim 1 wherein a proximal end of the at least one conductive sinusoidal element defines a gap with adjacent portions of the conductive ground plane.

10. The communications device of claim 1 wherein the circular cylindrical antenna has an operating wavelength; wherein the circular cylinder has a diameter between 0.3 and 0.5 of the operating wavelength; wherein the circular cylinder has a height between 0.5 and 1 of the operating wavelength; and wherein the at least one conductive sinusoidal element defines a wave period between 0.1 and 0.3 of the operating wavelength.

11. The communications device of claim 1 wherein the at least one conductive sinusoidal element has a shape based upon $(d/4)\sin(2\pi f)+0.8(d/4)\sin(2\pi f)$; wherein f is an operating frequency of the circular cylindrical antenna; and wherein d is a diameter of the circular cylinder.

12. A circular cylindrical antenna to be coupled to a radio frequency (RF) device, the circular cylindrical antenna comprising:

a conductive ground plane;

at least one conductive feed associated with the conductive ground plane; and at least one conductive sinusoidal element coupled to the at least one conductive feed and extending outwardly from the conductive ground plane along a circular cylinder.

13. The circular cylindrical antenna of claim 12 wherein the at least one conductive sinusoidal element comprises a plurality of conductive sinusoidal elements; and wherein the at least one conductive feed comprises a plurality of conductive feeds with a respective conductive feed coupled to each conductive sinusoidal element.

14. The circular cylindrical antenna of claim 13 wherein the plurality of conductive sinusoidal elements comprises four conductive sinusoidal elements equally-sized and arranged about the circular cylinder.

15. The circular cylindrical antenna of claim 13 wherein the at least one conductive sinusoidal element is configured to operate in at least one of a right-handed circular polarization (RHCP), a left-handed circular polarization (LHCP), a first linear polarization, and a second linear polarization different from the first linear polarization.

16. The circular cylindrical antenna of claim 13 wherein adjacent ones of the plurality of conductive sinusoidal elements are nested together.

17. The circular cylindrical antenna of claim 12 comprising a circular cylindrical dielectric substrate; and wherein the at least one conductive sinusoidal element comprises at least one conductive trace on the circular cylinder dielectric substrate.

18. The circular cylindrical antenna of claim 12 wherein the at least one conductive feed comprises at least one coaxial cable feed coupled to the RF device, the at least one coaxial cable feed comprising an inner conductor and an outer conductor surrounding the inner conductor; wherein the outer conductor is coupled to the conductive ground plane; and wherein the inner conductor extends through the conductive ground plane and is coupled to a proximal end of the at least one conductive sinusoidal element.

19. The circular cylindrical antenna of claim 12 wherein the at least one conductive sinusoidal element has an operating wavelength; wherein the circular cylinder has a diameter between 0.3 and 0.5 of the operating wavelength; wherein the circular cylinder has a height between 0.5 and 1 of the operating wavelength; and wherein the at least one conductive sinusoidal element defines a wave period between 0.1 and 0.3 of the operating wavelength.

20. A method for making a circular cylindrical antenna to be coupled to a radio frequency (RF) device, the method comprising:

forming a conductive ground plane;

positioning at least one conductive feed associated with the conductive ground plane; and forming at least one conductive sinusoidal element to be coupled to the at least one conductive feed and extending outwardly from the conductive ground plane along a circular cylinder.

21. The method of claim 20 wherein the at least one conductive sinusoidal element comprises a plurality of conductive sinusoidal elements; and wherein the at least one conductive feed comprises a plurality of conductive feeds with a respective conductive feed coupled to each conductive sinusoidal element.

22. The method of claim 21 wherein the plurality of conductive sinusoidal elements comprises four conductive sinusoidal elements equally-sized and arranged about the circular cylinder; and wherein adjacent ones of the plurality of conductive sinusoidal elements are nested together.

23. The method of claim 21 wherein the circular cylindrical antenna is configured to operate in at least one of a right-handed circular polarization (RHCP), a left-handed circular polarization (LHCP), a first linear polarization, and a second linear polarization different from the first linear polarization.

24. The communications device of claim 1 where the at least one conductive sinusoidal element has a variable rate of structural period.

25. The circular cylindrical antenna of claim 12 where the at least one conductive sinusoidal element has a variable rate of structural amplitude.

* * * * *